United States Patent
Karlov et al.

(10) Patent No.: US 10,853,990 B2
(45) Date of Patent: Dec. 1, 2020

(54) SYSTEM AND METHOD FOR PROCESSING A GRAPHIC OBJECT

(71) Applicant: CANON KABUSHIKI KAISHA, Tokyo (JP)

(72) Inventors: David Karlov, Emu Plains (AU); Colin Eric Druitt, Westleigh (AU); Matthew Raphael Arnison, Umina Beach (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/403,375

(22) Filed: May 3, 2019

(65) Prior Publication Data
US 2019/0347854 A1    Nov. 14, 2019

(30) Foreign Application Priority Data
May 11, 2018  (AU) ................................ 2018203327

(51) Int. Cl.
    *G06T 15/04*  (2011.01)
    *G06T 11/00*  (2006.01)
    *G06T 11/60*  (2006.01)

(52) U.S. Cl.
    CPC ............ *G06T 15/04* (2013.01); *G06T 11/001* (2013.01); *G06T 11/60* (2013.01); *G06T 2210/56* (2013.01)

(58) Field of Classification Search
    CPC ........ G06T 11/001; G06T 15/04; G06T 11/60
    See application file for complete search history.

(56) References Cited

U.S. PATENT DOCUMENTS

| | | | |
|---|---|---|---|
| 7,495,663 B2 | 2/2009 | Maillot | |
| 9,305,389 B2 | 4/2016 | Maillot | |
| 9,396,585 B2 | 7/2016 | Magder et al. | |
| 9,747,720 B2 | 8/2017 | Buron et al. | |
| 2003/0160785 A1* | 8/2003 | Baumberg | G06T 15/04 345/419 |
| 2013/0127889 A1* | 5/2013 | Winnemoeller | G06T 11/001 345/582 |

OTHER PUBLICATIONS

"3D painting in Adobe Photoshop", https://helpx.adobe.com/photoshop/using/3d-painting-photoshop.html, retrieved on Oct. 17, 2017.

* cited by examiner

*Primary Examiner* — Phi Hoang
(74) *Attorney, Agent, or Firm* — Canon U.S.A., Inc. IP Division

(57) ABSTRACT

A method for processing a three-dimensional graphic object. The method comprises receiving a query point and an associated query region, the query point being positioned within a reference fragment of a texture image of the three-dimensional graphic object; determining reference points on a boundary of the reference fragment using the query region, the reference points associated with target points on a boundary of a target fragment of the texture image, the reference points and the query point forming a reference angle; and determining a portion of the target fragment covered by the query region using an anchor point located outside the target fragment. The anchor point is determined using the target points and the reference angle. Angles between the anchor point and the target points correspond to angles between the query and reference points. The three-dimensional graphic object is processed using the determined portion of the target fragment.

20 Claims, 16 Drawing Sheets

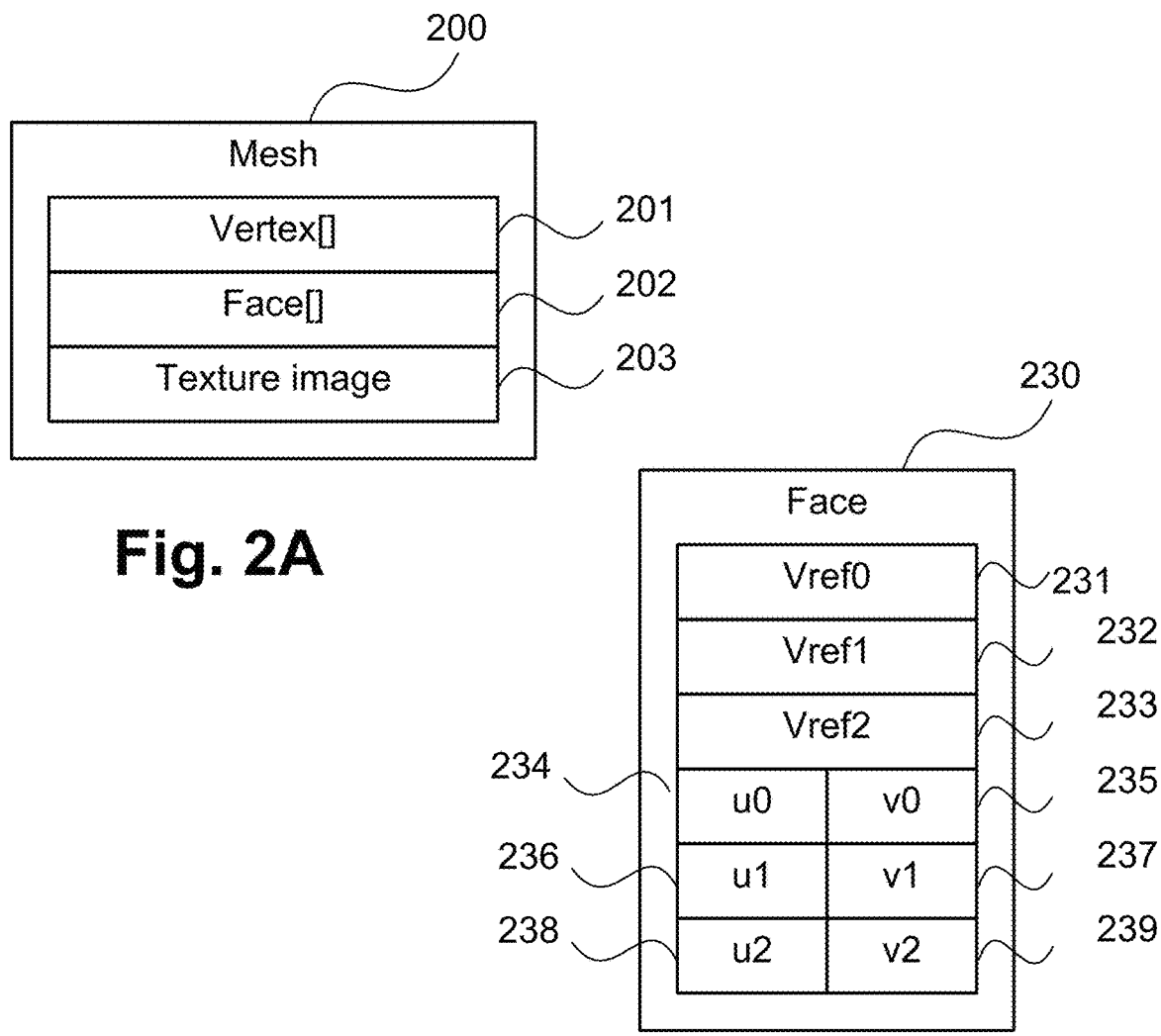
Fig. 2A
Fig. 2C
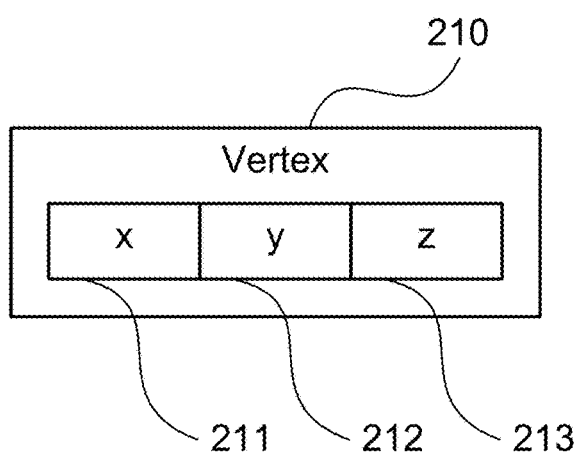
Fig. 2B

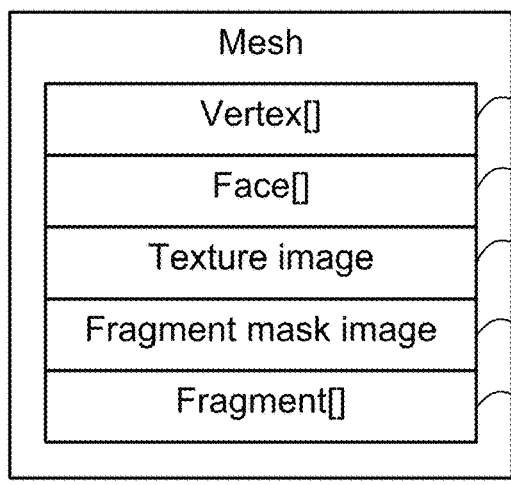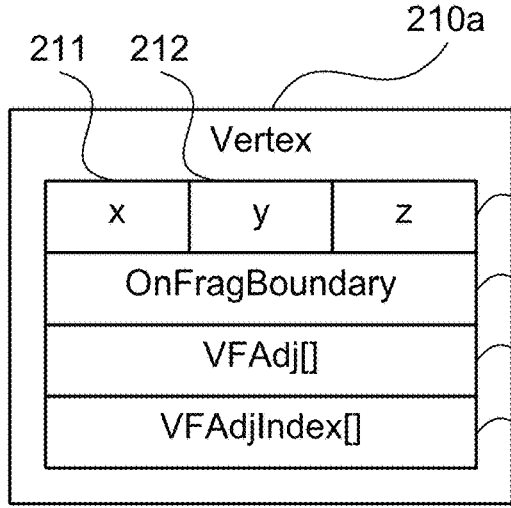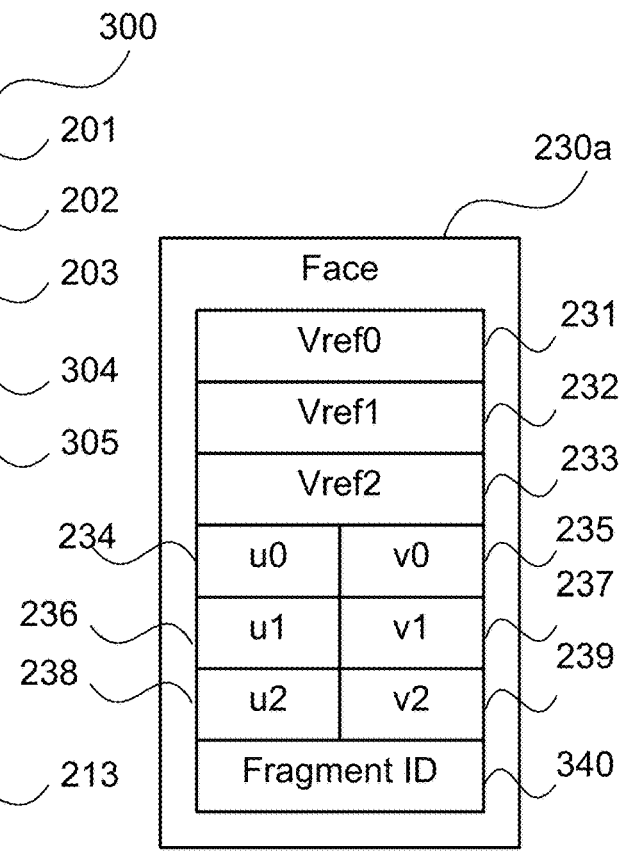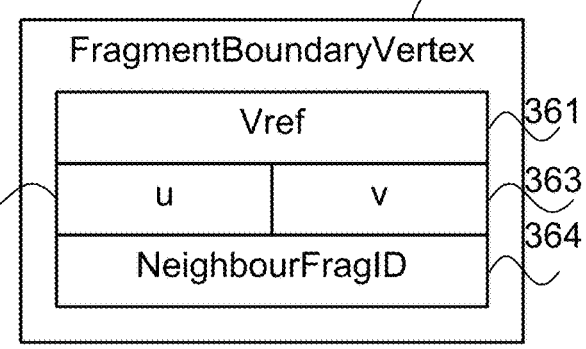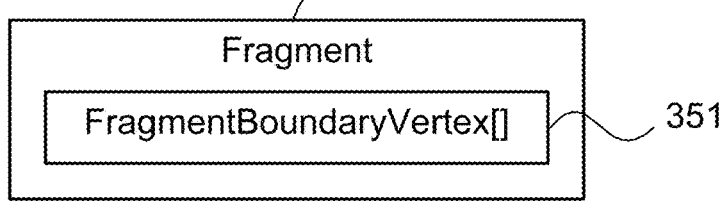

SYSTEM AND METHOD FOR PROCESSING A GRAPHIC OBJECT

REFERENCE TO RELATED APPLICATION(S)

This application claims the benefit under 35 U.S.C. § 119 of the filing date of Australian Patent Application No. 2018203327, filed 11 May 2018, hereby incorporated by reference in its entirety as if fully set forth herein.

TECHNICAL FIELD

The present invention relates generally to three-dimensional geometry processing and modelling, and in particular, to methods for processing texture information of a parameterised 3D surface in the presence of texture seams.

BACKGROUND

Digital three-dimensional (3D) graphical models are used in a wide range of applications. Digital three-dimensional graphical models are often surface models, and often take the form of a 3D mesh. Detailed surface information is commonly represented on a 3D surface model using texture mapping techniques. Texture mapping allows surface details, such as colour or other information, to be efficiently represented over the surface of the 3D model. Texture information is commonly represented in a two-dimensional (2D) co-ordinate space ("texture space"), the two dimensions being conventionally referred to as u and v. Representation of texture information in two dimensions is conventionally referred to as UV mapping.

The process of parameterisation, UV mapping, or texture mapping, creates a mapping between 3D co-ordinates on the surface model, and 2D co-ordinates in texture space. Because texture space is flat, and the 3D surface generally is not flat, some distortion is inevitable. In distortion, angles or areas on the surface model deviate from corresponding angles or areas in texture space. Distortion is commonly minimised by breaking the surface details in texture space into multiple texture regions called fragments, or islands.

In many applications, it is desirable to apply area-based operations to some contiguous region of a surface model. For example, in mesh editing applications, a region of the surface may be painted using a given brush, and in mesh processing applications, regions of the surface, at small or large scales, may be sampled to perform some image processing operation. However, area-based operations are problematic where the texture has been broken into fragments, and the area crosses a fragment boundary, or seam.

Faced with the problem of applying texture across fragments, existing mesh editing applications commonly effect texture painting operations only within a single fragment (such as the fragment underlying the centre of a brush). Effecting texture painting only within a single fragment makes it difficult for users to paint details in the vicinity of a seam, and can cause the painting region to appear to "jump" unexpectedly when the brush centre crosses into the next fragment. Recognising the drawbacks with effecting texture only in a single fragment, some mesh editing applications provide an alternative projection painting mode. In projection painting mode a brush-shaped region in screen space is projected onto the mesh surface. The projection painting mode can paint onto multiple fragments in a single operation, but suffers from poor performance due to the 3D projection operation, and can result in poor quality results. Poor quality results are particularly common where the mesh surface is rough, as projection painting can leave gaps and cracks unpainted.

Another class of techniques for addressing the problem of painting texture across seams involves multiple or dynamic parameterisations, rather than a single fixed parameterisation. For example, a dynamic parameterisation may be formed around a surface point of interest. However, the dynamic parameterisation methods are unsuitable for large-scale texture-space operations, having no single globally consistent two-dimensional texture representation. That is, a point on the mesh surface may map to different points in texture space, depending on where the focal point of the dynamic parameterisation lies.

Another known technique builds a list of face pairs which share an edge that lies on a fragment boundary, and uses this list to add extra mesh triangles immediately adjacent to and outside fragment boundaries, which can resolve region-based queries falling within those triangles. However, the known techniques do not support larger queries which extend more than one mesh triangle across a fragment boundary.

SUMMARY

It is an object of the present invention to substantially overcome, or at least ameliorate, at least one disadvantage of present arrangements.

One aspect of the present disclosure provides a method for processing a three-dimensional graphic object, the method comprising: receiving a query point and a query region associated with the query point, the query point being positioned within a reference fragment of a texture image of the three-dimensional graphic object; determining reference points on a boundary of the reference fragment using the query region, the reference points being associated with target points on a boundary of a target fragment of the texture image, wherein the reference points and the query point form a reference angle; determining a portion of the target fragment covered by the query region using an anchor point located outside the target fragment, the anchor point being determined using the target points and the reference angle such that angles between the anchor point and the target points correspond to angles between the query point and the reference points; and processing the three-dimensional graphic object using the determined portion of the target fragment.

In another aspect, processing the graphic object comprises editing a texture of the graphic object.

In another aspect, the portion of the target fragment covered by the mask is determined by positioning the query region according to the anchor point.

In another aspect, positioning comprises rotating the query region according to a target angle, scaling the query region according to a target scale, and translating the query region to the anchor point.

In another aspect, the target angle is a difference of a first angle and a second angle, the first angle being formed using the reference points and the second angle being formed using target points associated with the reference points.

In another aspect, the target scale is a ratio of a distance between the reference points and a distance between the target points.

In another aspect, the anchor point is determined such that a target triangle formed by the anchor point and target points is similar to a reference triangle formed by the query point and the reference points.

In another aspect, the reference points comprise a most distant pair of an array of points associated with the query region, the array of points being constrained to a boundary of the reference fragment relating to the query region.

In another aspect, each of the target points is associated with one of the reference points by means of a common geometry feature of the three-dimensional graphic object corresponding to both the target point and the reference point.

In another aspect, the common geometry feature is at least one of a vertex and a point on an edge.

In another aspect, the anchor point is used as a query point for a further target fragment, and the received query region is transformed based on geometry data associated with the reference fragment, the target fragment, and the further target fragment.

In another aspect, processing the graphic object comprises generating a margin image for the reference fragment using a plurality of query points, the margin image being generated by combining texture of the reference fragment and texture of the determined portion of the target fragment for each of the query points.

In another aspect, the three-dimensional graphic object is a polygonal mesh having a mapping between co-ordinates of the mesh and co-ordinates of the texture image.

Another aspect of the present disclosure provides a method of interactively editing a texture image of a three-dimensional mesh, the method comprising: receiving a user command to edit the texture image on the three-dimensional mesh, the user command defining a query point in a reference fragment and a region associated with the query point based on a selected editing instrument; for a fragment of a plurality of fragments of the texture image associated with the region, determining an anchor point corresponding to a location of the query point with respect to the fragment based on the three-dimensional mesh, the determined anchor point and the query point having different locations in the texture image; transforming the region to determine a corresponding portion of the fragment to be edited, the transformation being based on the anchor point and relative placement in the texture image of the fragment and the reference fragment; and interactively editing the texture image by applying the user command to the determined portion of the fragment.

In another aspect, the anchor point for each fragment is determined based upon common geometry features of the plurality of fragments.

In another aspect, the anchor point for each fragment is determined based upon pairs of most distant vertices of common edges of the plurality of fragments.

In another aspect, the geometric relationship of the anchor points relates to a scale and an angle reflecting vertices on a common boundary of the adjoining ones of the plurality of fragments.

Another aspect of the present disclosure provides apparatus, comprising: a processor; and a memory device storing a software program for directing the processor to perform a method for processing a three-dimensional graphic object, the method comprising the steps of: receiving a query point and a query region associated with the query point, the query point being positioned within a reference fragment of a texture image of the three-dimensional graphic object; determining reference points on a boundary of the reference fragment using the query region, the reference points being associated with target points on a boundary of a target fragment of the texture image, wherein the reference points and the query point form a reference angle; determining a portion of the target fragment covered by the query region using an anchor point located outside the target fragment, the anchor point being determined using the target points and the reference angle such that angles between the anchor point and the target points correspond to angles between the query point and the reference points; and processing the three-dimensional graphic object using the determined portion of the target fragment.

Another aspect of the present disclosure provides a system comprising: a processor; and a memory device storing a software program for directing the processor to perform a method comprising the steps of: receiving a query point and a query region associated with the query point, the query point being positioned within a reference fragment of a texture image of the three-dimensional graphic object; determining reference points on a boundary of the reference fragment using the query region, the reference points being associated with target points on a boundary of a target fragment of the texture image, wherein the reference points and the query point form a reference angle determining a portion of the target fragment covered by the query region using an anchor point located outside the target fragment, the anchor point being determined using the target points and the reference angle such that angles between the anchor point and the target points correspond to angles between the query point and the reference points; and processing the three-dimensional graphic object using the determined portion of the target fragment.

Another aspect of the present disclosure provides a non-transitory computer readable storage medium storing program instructions for processing a three-dimensional graphic object, the program comprising: code for receiving a query point and a query region associated with the query point, the query point being positioned within a reference fragment of a texture image of the three-dimensional graphic object; code for determining reference points on a boundary of the reference fragment using the query region, the reference points being associated with target points on a boundary of a target fragment of the texture image, wherein the reference points and the query point form a reference angle; code for determining a portion of the target fragment covered by the query region using an anchor point located outside the target fragment, the anchor point being determined using the target points and the reference angle such that angles between the anchor point and the target points correspond to angles between the query point and the reference points; and code for processing the three-dimensional graphic object using the determined portion of the target fragment.

Other aspects are also described.

BRIEF DESCRIPTION OF THE DRAWINGS

One or more embodiments of the invention will now be described with reference to the following drawings, in which:

FIGS. 2A to 2C show a 3D mesh data structure;

FIGS. 3A to 3E show an augmented 3D mesh data structure;

DETAILED DESCRIPTION INCLUDING BEST MODE

Figure 1:
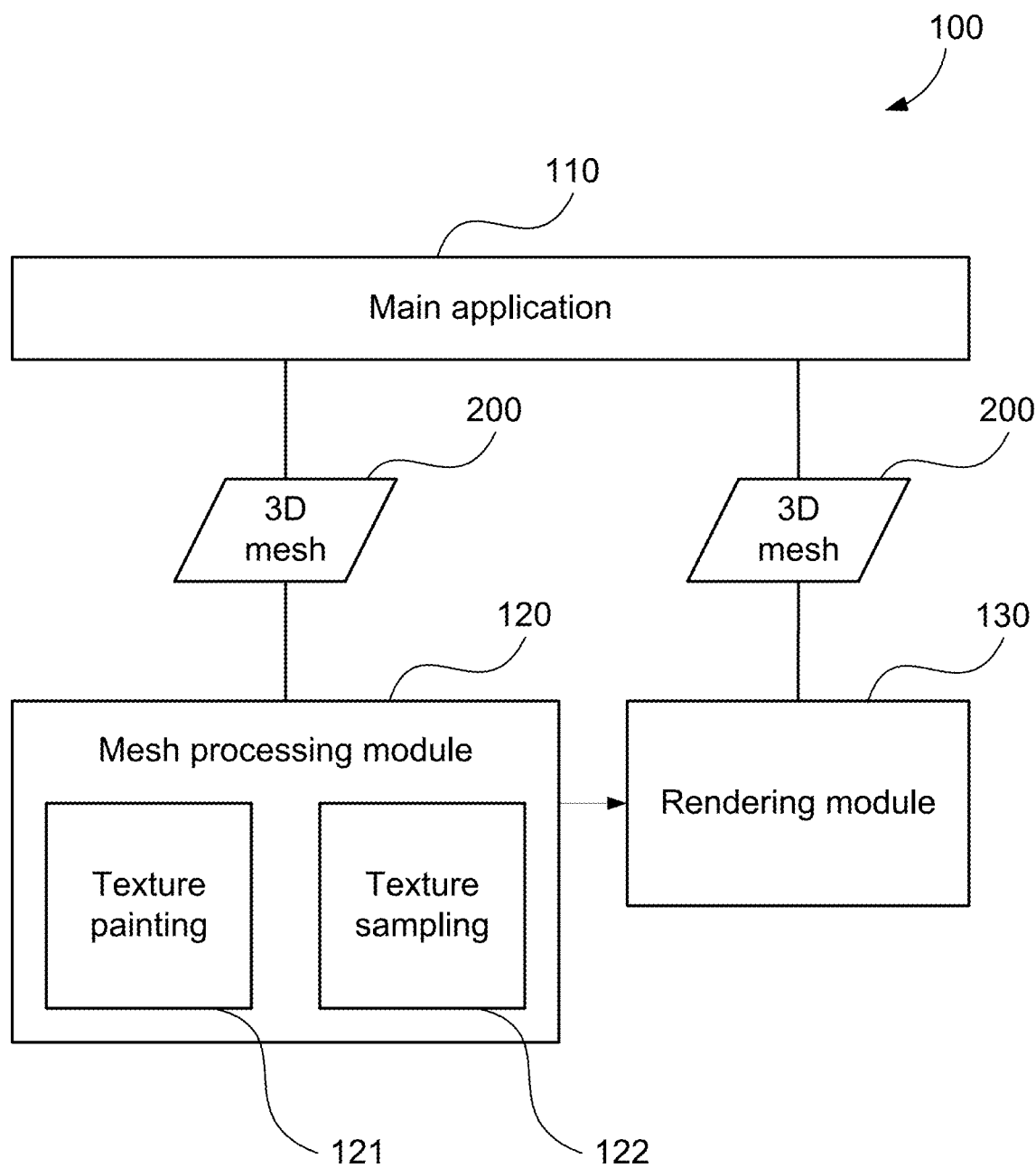
FIG. 1 is a schematic block diagram of a 3D graphics processing architecture.

Where reference is made in any one or more of the accompanying drawings to steps and/or features, which have the same reference numerals, those steps and/or features have for the purposes of this description the same function (s) or operation(s), unless the contrary intention appears.

The arrangements described seek to address the above problems by determining one or more anchor points, each associated with a neighbouring fragment, and each corresponding to a query point associated with the fragment on which query point lies. The parts of a texture image within a query region are determined by overlaying a query mask on the query point and each anchor point, and intersecting each mask with its respective associated fragment.

FIG. 1 shows a software architecture 100 for processing and editing three-dimensional (3D) graphic objects using the described methods. A main application 110 drives the processing. The main application 110 may be an interactive application including a graphical user interface, or it may be a non-interactive processing step in an automated workflow. The three-dimensional graphic object is a polygonal mesh 200 having a mapping between co-ordinates of the mesh and co-ordinates of a texture image of the object reproduced by the graphical user interface.

The main application 110 passes a 3D mesh 200 to a mesh processing module 120 in order to generate texture for the mesh 200. A data structure of the mesh 200 is shown in FIGS. 2A to 2C. The mesh processing module 120 includes a module for texture painting 121, in which a region of a mesh texture in a specified region around a painting location may be modified. The specified region relates to a selected editing instrument, such as a region associated with a brush instrument. The mesh processing module 120 also includes a module for texture sampling 122, in which a region of a mesh texture in a specified query shape around a sampling location may be sampled and extracted into a single unified 2D patch. Both the texture painting submodule 121 and the texture sampling submodule 122 make use of neighbourhood query methods described to process regions of texture data despite the presence of texture seams. In the context of the present disclosure, a "neighbourhood query" relates to determining portions of fragments of a texture image to be edited in response to receiving a user command or query.

The term "query point" is used in the arrangements described to encompass both a painting location and a sampling location. The query point is a two-dimensional UV location in the space of a texture image 203 (shown in FIG. 2B). However, the query point may be specified according to a three-dimensional location on the surface of the mesh 200, subsequently mapped to 2D via UV co-ordinates 234-239 of a face 230 containing the query point, as shown in FIG. 2C. The query point is associated with a "mask" (also referred to as a "query region" or "query range"), specifying the region around the query point to be processed. In the case of texture painting sub-module 121, the mask is determined by the painting brush selection, and in texture sampling sub-module 122, the mask is defined by the query shape. The mask is typically centred on the query point. Both the texture painting 121 and texture sampling 122 sub-modules process regions of a mesh texture with high quality and performance regardless of the presence of fragment seams.

Referring to FIG. 1, the 3D mesh 200 may also be provided to a rendering module 130. The rendering module 130 creates a 2D view of the 3D object represented by the mesh 200, including rendering one or more textures on the mesh surface. The application 110 may also make advantageous use of neighbourhood query methods in the mesh processing module 120 not having a rendering module 130. In some arrangements, the mesh 200 as updated by execution of the mesh processing module 120 (or sub-modules thereof) can be provided to the rendering module 130.

As shown in FIG. 2A, the 3D mesh 200 passed from the main application 110 to the mesh processing module 120 comprises a vertex array 201, a face array 202, and one or more texture images 203. The vertex array 201 is an array of vertices. An example vertex 210 is shown in FIG. 2B. As shown in FIG. 2B, each vertex comprises an x 211, y 212, and z 213 co-ordinate value. The values 211 to 213 define the location of the vertex 210 in the 3D space of the mesh. The face array 202 is an array of faces, an example face 230 being shown in FIG. 2C. As shown in FIG. 2C, each face comprises three references to vertices (Vref0 231, Vref1 232, and Vref2 233). Each of the references 231 to 233 is an integer index into the corresponding Vertex array 201. Three vertex references are used in the case that any of the faces 230 are triangular. Four vertex references may be used for quadrangular faces. Other numbers of vertex references are also possible. Each face further comprises a set of UV co-ordinates for each of the vertex references. For example, in FIG. 2C, u0 234 and v0 235 correspond to Vref0 231. Additionally, u1 236 and v1 237 correspond to Vref1 232, and u2 238 and v2 239 correspond to Vref2 233. The UV co-ordinates 234 to 239 map a triangular face, the face 230 on the 3D surface of the mesh 200, to a triangle in the 2D co-ordinate system of texture image 203. The texture elements corresponding to positions along the edges and in the interior of face 230 are found by interpolating the UV space triangle formed by the UV co-ordinates 234-239 of the face 230. The UV co-ordinates 234-239 may be stored directly as UV co-ordinates in the face 230, or may be stored as UV references which index into a UV co-ordinate table stored separately in the mesh 200.

In the examples described herein the face 230 is triangular, as commonly used in mesh rendering applications. However, mesh faces can be other shapes, such as a polygon with more than three edges. The arrangements described apply equally to all meshes with polygonal faces.

Figure 15A:
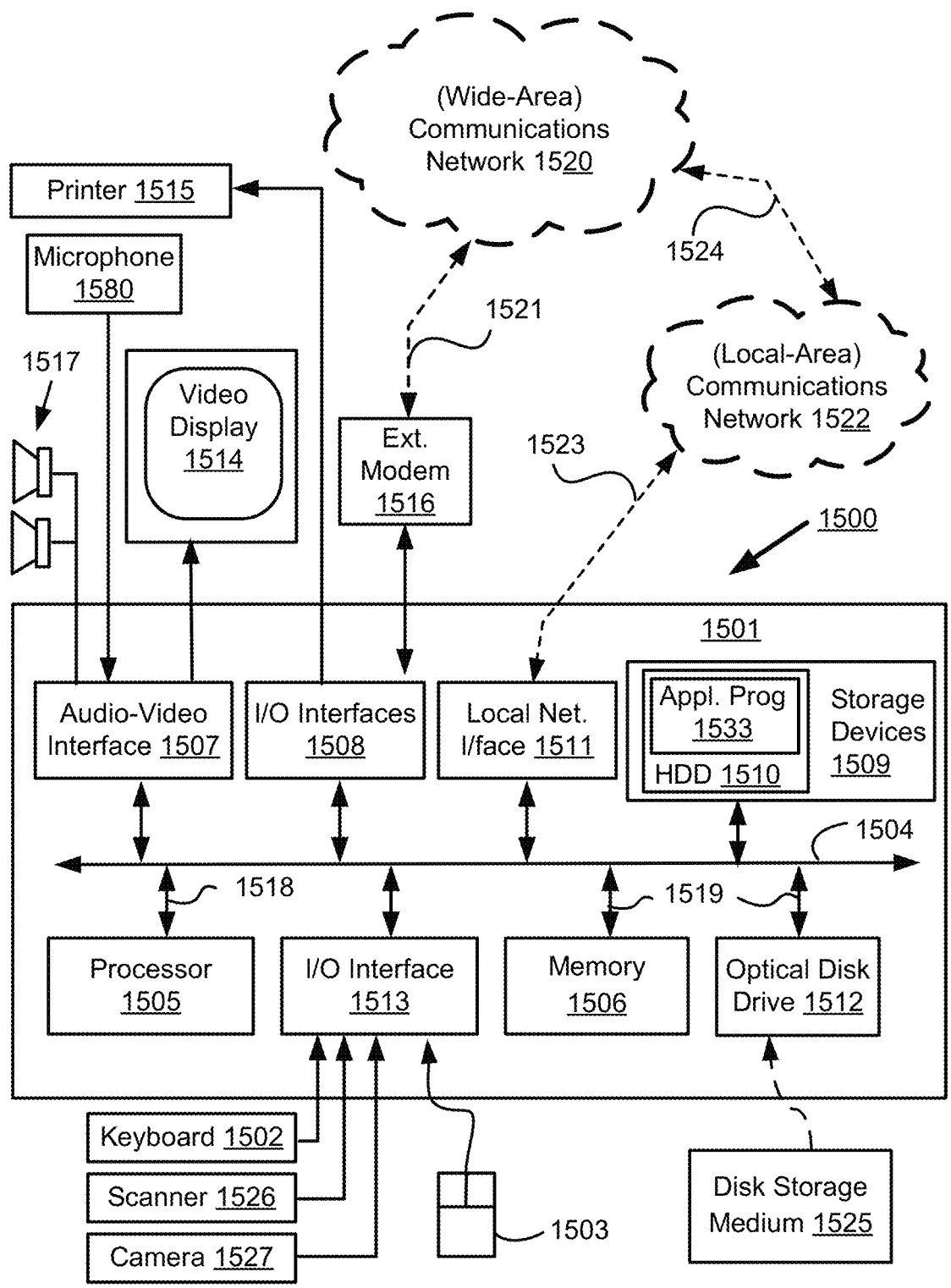
FIGS. 15A and 15B collectively form a schematic block diagram representation of an electronic device upon which described arrangements can be practised.
Figure 15B:
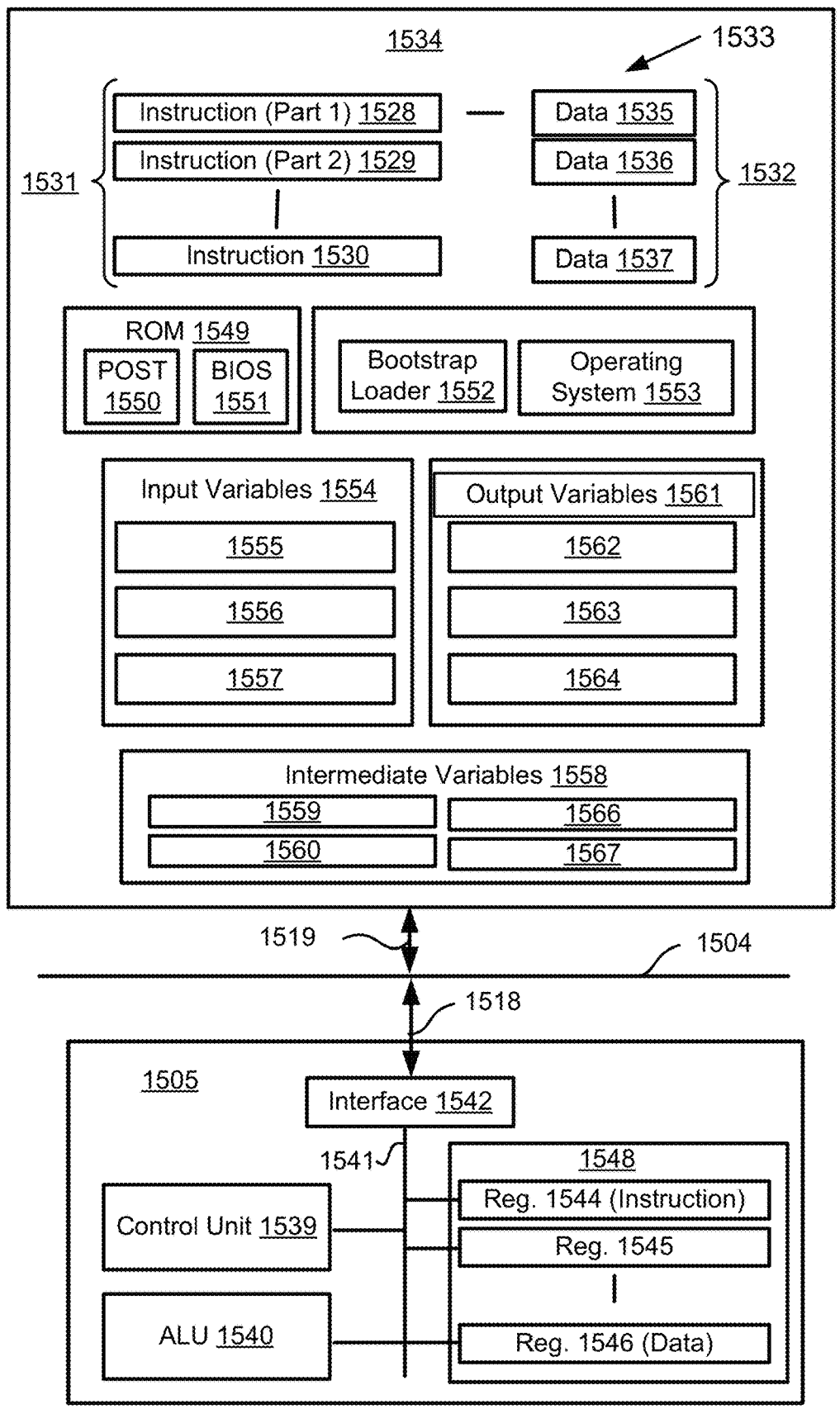

FIGS. 15A and 15B depict a general-purpose computer system 1500, upon which the various arrangements described can be practiced.

As seen in FIG. 15A, the computer system 1500 includes: a computer module 1501; input devices such as a keyboard 1502, a mouse pointer device 1503, a scanner 1526, a camera 1527, and a microphone 1580; and output devices including a printer 1515, a display device 1514 and loudspeakers 1517. An external Modulator-Demodulator (Modem) transceiver device 1516 may be used by the computer module 1501 for communicating to and from a communications network 1520 via a connection 1521. The communications network 1520 may be a wide-area network (WAN), such as the Internet, a cellular telecommunications network, or a private WAN. Where the connection 1521 is a telephone line, the modem 1516 may be a traditional "dial-up" modem. Alternatively, where the connection 1521 is a high capacity (e.g., cable) connection, the modem 1516 may be a broadband modem. A wireless modem may also be used for wireless connection to the communications network 1520.

The computer module 1501 typically includes at least one processor unit 1505, and a memory unit 1506. For example, the memory unit 1506 may have semiconductor random access memory (RAM) and semiconductor read only memory (ROM). The computer module 1501 also includes an number of input/output (I/O) interfaces including: an audio-video interface 1507 that couples to the video display 1514, loudspeakers 1517 and microphone 1580; an I/O interface 1513 that couples to the keyboard 1502, mouse 1503, scanner 1526, camera 1527 and optionally a joystick or other human interface device (not illustrated); and an interface 1508 for the external modem 1516 and printer 1515. In some implementations, the modem 1516 may be incorporated within the computer module 1501, for example within the interface 1508. The computer module 1501 also has a local network interface 1511, which permits coupling of the computer system 1500 via a connection 1523 to a local-area communications network 1522, known as a Local Area Network (LAN). As illustrated in FIG. 15A, the local communications network 1522 may also couple to the wide network 1520 via a connection 1524, which would typically include a so-called "firewall" device or device of similar functionality. The local network interface 1511 may comprise an Ethernet circuit card, a Bluetooth® wireless arrangement or an IEEE 802.11 wireless arrangement; however, numerous other types of interfaces may be practiced for the interface 1511.

The I/O interfaces 1508 and 1513 may afford either or both of serial and parallel connectivity, the former typically being implemented according to the Universal Serial Bus (USB) standards and having corresponding USB connectors (not illustrated). Storage devices 1509 are provided and typically include a hard disk drive (HDD) 1510. Other storage devices such as a floppy disk drive and a magnetic tape drive (not illustrated) may also be used. An optical disk drive 1512 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1500.

The components 1505 to 1513 of the computer module 1501 typically communicate via an interconnected bus 1504 and in a manner that results in a conventional mode of operation of the computer system 1500 known to those in the relevant art. For example, the processor 1505 is coupled to the system bus 1504 using a connection 1518. Likewise, the memory 1506 and optical disk drive 1512 are coupled to the system bus 1504 by connections 1519. Examples of computers on which the described arrangements can be practised include IBM-PC's and compatibles, Sun Sparestations, Apple Mac™ or like computer systems.

The methods described may be implemented using the computer system 1500 wherein the processes of FIGS. 5 to 11, to be described, may be implemented as one or more software application programs 1533 executable within the computer system 1500. In particular, the steps of the methods of editing a graphic object are effected by instructions 1531 (see FIG. 15B) in the software 1533 that are carried out within the computer system 1500. The software instructions 1531 may be formed as one or more code modules, each for performing one or more particular tasks. The software may also be divided into two separate parts, in which a first part and the corresponding code modules performs the described methods and a second part and the corresponding code modules manage a user interface between the first part and the user.

The programs 1533 typically include the architecture 100 and corresponding modules 110, 120 and 130. For example, the application 110 may relate to a graphics application installed on the computer module 101.

The software may be stored in a computer readable medium, including the storage devices described below, for example. The software is loaded into the computer system 1500 from the computer readable medium, and then executed by the computer system 1500. A computer readable medium having such software or computer program recorded on the computer readable medium is a computer program product. The use of the computer program product in the computer system 1500 preferably effects an advantageous apparatus for editing a graphic object.

The software 1533 is typically stored in the HDD 1510 or the memory 1506. The software is loaded into the computer system 1500 from a computer readable medium, and executed by the computer system 1500. Thus, for example, the software 1533 may be stored on an optically readable disk storage medium (e.g., CD-ROM) 1525 that is read by the optical disk drive 1512. A computer readable medium having such software or computer program recorded on it is a computer program product. The use of the computer program product in the computer system 1500 preferably effects an apparatus for editing a graphic object.

In some instances, the application programs 1533 may be supplied to the user encoded on one or more CD-ROMs 1525 and read via the corresponding drive 1512, or alternatively may be read by the user from the networks 1520 or 1522. Still further, the software can also be loaded into the computer system 1500 from other computer readable media. Computer readable storage media refers to any non-transitory tangible storage medium that provides recorded instructions and/or data to the computer system 1500 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 1501. Examples of transitory or non-tangible computer readable transmission media that may also participate in the provision of software, application programs, instructions and/or data to the computer module 1501 include radio or infra-red transmission channels as well as a network connection to another computer or networked device, and the Internet or Intranets including e-mail transmissions and information recorded on Websites and the like.

The second part of the application programs 1533 and the corresponding code modules mentioned above may be executed to implement one or more graphical user interfaces (GUIs) to be rendered or otherwise represented upon the display 1514. Through manipulation of typically the keyboard 1502 and the mouse 1503, a user of the computer system 1500 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1517 and user voice commands input via the microphone 1580.

FIG. 15B is a detailed schematic block diagram of the processor 1505 and a "memory" 1534. The memory 1534 represents a logical aggregation of all the memory modules (including the HDD 1509 and semiconductor memory 1506) that can be accessed by the computer module 1501 in FIG. 15A.

When the computer module 1501 is initially powered up, a power-on self-test (POST) program 1550 executes. The POST program 1550 is typically stored in a ROM 1549 of the semiconductor memory 1506 of FIG. 15A. A hardware device such as the ROM 1549 storing software is sometimes referred to as firmware. The POST program 1550 examines hardware within the computer module 1501 to ensure proper functioning and typically checks the processor 1505, the memory 1534 (1509, 1506), and a basic input-output systems software (BIOS) module 1551, also typically stored in the ROM 1549, for correct operation. Once the POST program 1550 has run successfully, the BIOS 1551 activates the hard disk drive 1510 of FIG. 15A. Activation of the hard disk drive 1510 causes a bootstrap loader program 1552 that is resident on the hard disk drive 1510 to execute via the processor 1505. This loads an operating system 1553 into the RAM memory 1506, upon which the operating system 1553 commences operation. The operating system 1553 is a system level application, executable by the processor 1505, to fulfil various high level functions, including processor management, memory management, device management, storage management, software application interface, and generic user interface.

The operating system 1553 manages the memory 1534 (1509, 1506) to ensure that each process or application running on the computer module 1501 has sufficient memory in which to execute without colliding with memory allocated to another process. Furthermore, the different types of memory available in the system 1500 of FIG. 15A must be used properly so that each process can run effectively. Accordingly, the aggregated memory 1534 is not intended to illustrate how particular segments of memory are allocated (unless otherwise stated), but rather to provide a general view of the memory accessible by the computer system 1500 and how such is used.

As shown in FIG. 15B, the processor 1505 includes a number of functional modules including a control unit 1539, an arithmetic logic unit (ALU) 1540, and a local or internal memory 1548, sometimes called a cache memory. The cache memory 1548 typically includes a number of storage registers 1544-1546 in a register section. One or more internal busses 1541 functionally interconnect these functional modules. The processor 1505 typically also has one or more interfaces 1542 for communicating with external devices via the system bus 1504, using a connection 1518. The memory 1534 is coupled to the bus 1504 using a connection 1519.

The application program 1533 includes a sequence of instructions 1531 that may include conditional branch and loop instructions. The program 1533 may also include data 1532 which is used in execution of the program 1533. The instructions 1531 and the data 1532 are stored in memory locations 1528, 1529, 1530 and 1535, 1536, 1537, respectively. Depending upon the relative size of the instructions 1531 and the memory locations 1528-1530, a particular instruction may be stored in a single memory location as depicted by the instruction shown in the memory location 1530. Alternately, an instruction may be segmented into a number of parts each of which is stored in a separate memory location, as depicted by the instruction segments shown in the memory locations 1528 and 1529.

In general, the processor 1505 is given a set of instructions which are executed therein. The processor 1505 waits for a subsequent input, to which the processor 1505 reacts to by executing another set of instructions. Each input may be provided from one or more of a number of sources, including data generated by one or more of the input devices 1502, 1503, data received from an external source across one of the networks 1520, 1502, data retrieved from one of the storage devices 1506, 1509 or data retrieved from a storage medium 1525 inserted into the corresponding reader 1512, all depicted in FIG. 15A. The execution of a set of the instructions may in some cases result in output of data. Execution may also involve storing data or variables to the memory 1534.

The described arrangements use input variables 1554, which are stored in the memory 1534 in corresponding memory locations 1555, 1556, 1557. The described arrangements produce output variables 1561, which are stored in the memory 1534 in corresponding memory locations 1562, 1563, 1564. Intermediate variables 1558 may be stored in memory locations 1559, 1560, 1566 and 1567.

Referring to the processor 1505 of FIG. 15B, the registers 1544, 1545, 1546, the arithmetic logic unit (ALU) 1540, and the control unit 1539 work together to perform sequences of micro-operations needed to perform "fetch, decode, and execute" cycles for every instruction in the instruction set making up the program 1533. Each fetch, decode, and execute cycle comprises:

a fetch operation, which fetches or reads an instruction 1531 from a memory location 1528, 1529, 1530;

a decode operation in which the control unit 1539 determines which instruction has been fetched; and an execute operation in which the control unit 1539 and/or the ALU 1540 execute the instruction.

Thereafter, a further fetch, decode, and execute cycle for the next instruction may be executed. Similarly, a store cycle may be performed by which the control unit 1539 stores or writes a value to a memory location 1532.

Each step or sub-process in the processes of FIGS. 5-11 is associated with one or more segments of the program 1533 and is performed by the register section 1544, 1545, 1546, the ALU 1540, and the control unit 1539 in the processor 1505 working together to perform the fetch, decode, and execute cycles for every instruction in the instruction set for the noted segments of the program 1533.

The methods described may alternatively be implemented in dedicated hardware such as one or more integrated circuits performing the functions or sub functions of the methods described. Such dedicated hardware may include graphic processors, digital signal processors, or one or more microprocessors and associated memories.

Neighbourhood query methods are described which achieve high quality and high performance region-based texture processing on the 3D mesh 200. In the methods described, a query point and a mask (query region) are processed to produce a set of anchor points. Each anchor point is a point corresponding to the query point with respect to a different fragment of the mesh 200. An anchor point consists of a UV position in the space of the texture image 203, as well as corresponding transformation values such as rotation and scale. Overlaying the mask in turn over each such fragment, at each corresponding anchor point, using each corresponding transformation, produces a set of texture regions in the texture image 203. The UV texture regions together correspond to a region on the surface of the 3D mesh 200 which is contiguous and forms a neighbourhood of the initial query point, even though each UV texture region may be non-contiguous in the space of the texture image 203.

The described methods enable the texture painting module 121 to paint non-contiguous texture regions on fragments corresponding to each anchor point to form a contiguous affected region on the surface of the mesh 200 resembling the shape of the brush, or, in the absence of distortion, matching precisely the shape of the brush. Similarly, the texture sampling module 122 can operate to sample determined non-contiguous texture regions on fragments corresponding to each anchor point to acquire a contiguous set of samples from the texture image 203, enabling conventional 2D image processing or analysis to be performed on the texture image 203 regardless of the presence of fragment seams.

Figure 5:
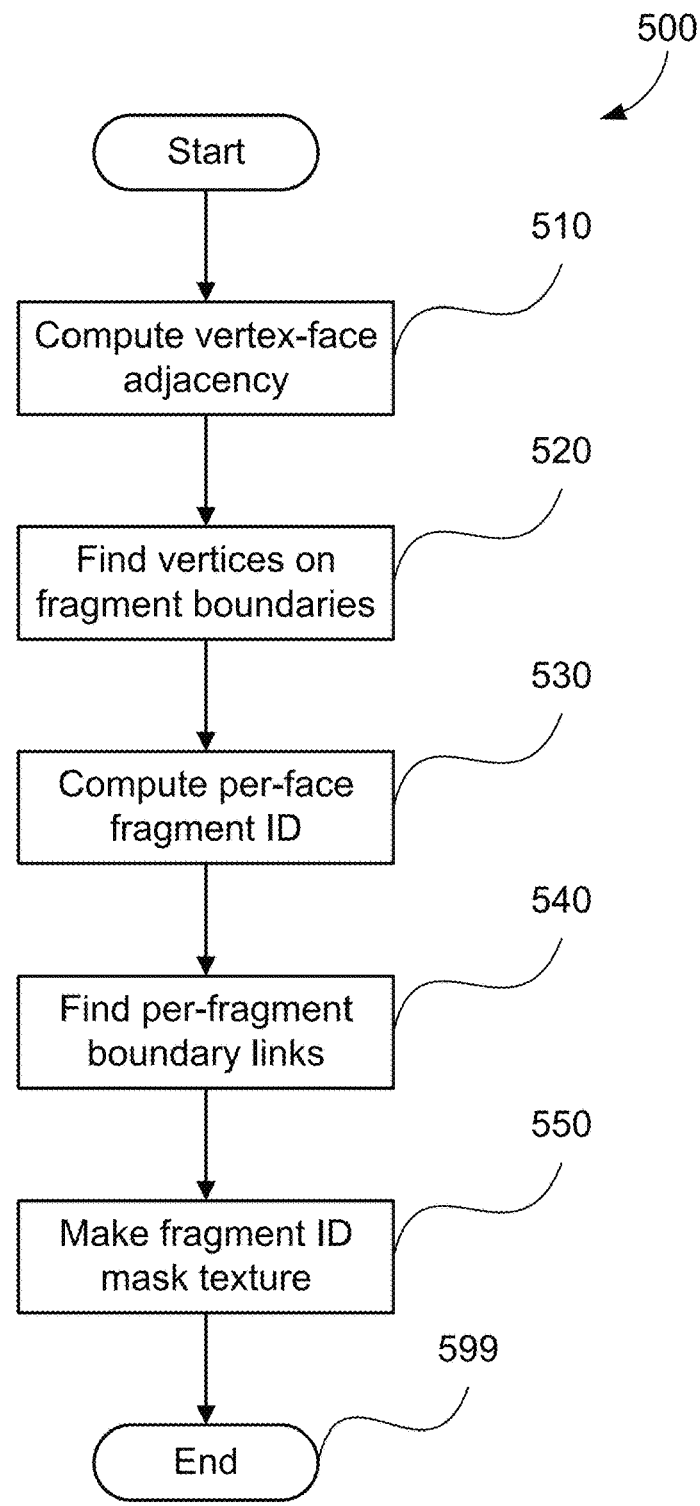
FIG. 5 shows a schematic flow diagram showing a method of augmenting a mesh data structure.

FIG. 5 shows a method 500 of augmenting a mesh data structure. The method 500 may be implemented as one or more module of the application 1533, for example as the texture painting submodule 121 and the texture sampling submodule 122, stored in the memory 1506 and controlled under execution of the processor 1505.

As shown in FIG. 5, the method 500 operates such that the mesh 200 is augmented to facilitate rapid calculation of the anchor points. The augmentation method 500 determines additional information of the mesh 200 which enables neighbourhood queries to be performed across texture seams. The method 500 is preferably performed as a pre-computation step, prior to receiving any queries. However, other arrangements are possible in which the method 500 is executed at the time of receiving a query, or at another time. The augmentations performed by augmentation method 500 are shown in FIGS. 3A to 3E, and are described together with the steps of the augmentation method 500. The method 500 generates an augmented mesh 300 from the mesh 200.

The augmentation method 500 begins at a step 510. In execution of step 510, a vertex-face adjacency is determined. In the step 510, for each vertex 210 in the vertex array 201 of the mesh 200, the faces 230 of the mesh 200 adjacent to that vertex are determined. A face 230 is considered adjacent to a vertex 210 if one of the vertex references 231-233 of the face refers to that vertex. The indexes of faces into the face array 202 which are adjacent to a vertex 210 are stored in a VFAdj array 317 of that vertex as shown in FIG. 3B. Additionally, the ordinality of the vertex within each adjacent face is stored in a VFAdjIndex array 318 of the vertex. The ordinality of the vertex is a number 0, 1, or 2, indicating whether the vertex is referenced by the face as Vref0 231, Vref1 232, or Vref2 233. The vertex-face adjacency may be determined by iterating through all faces 230 in the Face array 202, inspecting each vertex reference 231-233, and inserting a reference to the face in the VFAdj array 317 and VFAdjIndex array 318 of the corresponding vertex 210 to generate an augmented vertex 210*a*.

The method 500 continues from step 510 to a finding step 520. In step 520, the vertices on fragment boundaries are identified. A vertex 210 is on a fragment boundary if the vertex is referred to via a vertex reference 231-233 of a first face 230 with first UV co-ordinates 234-239, and is also referred to via a vertex reference 231-233 of a second face 230 with different UV co-ordinates 234-239. A fragment boundary may be found by iterating through each vertex 210 in the vertex array 201, and then inspecting each face adjacent to the vertex in the VFAdj array 317. The Boolean flag OnFragBoundary 316 is set to true for each augmented vertex 210*a* on a fragment boundary, and false for each other vertex.

The method 500 continues from step 520 to a determining step 530. In step 530 of augmentation method 500, a fragment identifier (ID) 340 (shown in FIG. 3C) is determined for each face 230 of the mesh 200, such that faces in the same UV fragment are assigned the same fragment identifier. The faces within a fragment may be found using a region-growing algorithm. Given a seed face which is not in a fragment already identified, the face is given a unique fragment identifier value. The neighbouring faces are given the same fragment ID, as long as those neighbours share at least one vertex with the face having common UV co-ordinates 234-239. The neighbouring faces of a face 230 may be found by examining the adjacent faces 317 of the vertices 210 and the references 231-233. The step 530 continues to repeat for the neighbours of the neighbouring faces, until the region can grow no more. The set of candidate seed faces may be all faces. In some arrangements, processing may be reduced by considering only the set of faces adjacent to fragment boundary vertices (that is, vertices 210 for which OnFragBoundary 316 is true) as candidate seed faces. At the completion of step 530, each face 230 in the mesh 200 has a fragment identifier 340 assigned, as shown as an augmented face 230*a*.

The method 500 continues from step 530 to a finding step 540. In step 540 of the augmentation method 500, boundary vertex links to neighbouring fragments are found for each texture fragment of the mesh 200. A boundary vertex link can be implemented as a vertex of a fragment, and the identifier (ID) of a neighbouring fragment at that vertex. An element FragmentBoundaryVertex 360 (see FIG. 3E) shows the members of a boundary vertex link, comprising a vertex reference Vref 361 indexing into the Vertex array 201; a u co-ordinate 362 and v co-ordinate 363 into the texture image 203 of the vertex in the current fragment; and an identifier 364 of a neighbouring fragment identifier at that vertex. A collection of FragmentBoundaryVertex elements 360 corresponding to vertices at the boundary of a single fragment is stored as a FragmentBoundaryVertex array 351 of a Fragment 350 (see FIG. 3D). A collection of all such fragments 350 is stored in a Fragment array 305 of the augmented mesh 300. The Fragment array 305 may be determined by first iterating through each fragment boundary vertex (vertices 210 for which OnFragBoundary 316 is true), and forming a list of the unique fragment identifiers and corresponding UV co-ordinates for the vertex 210, by examining the vertex's adjacent faces via the VFAdj array 317 of the vertex. The vertex is added as a FragmentBoundaryVertex 360 to the FragmentBoundaryVertex array 351 of a Fragment 305 for each fragment identifier in the list, with NeighbourFragID 364 set to the other fragment identifiers appearing in the list.

The method 500 continues from step 540 to a generating step 550. In step 550 of the augmentation method 500, a fragment identifier mask image 304 is generated (see FIG. 3A). The fragment ID mask image 304 is used by the mesh processing module 120 during neighbourhood query operations to easily identify the fragment associated with a point in UV space. The fragment identifier mask image 304 is a texture image which contains fragment identifiers rather than RGB pixels or other data. In the regions of the texture where no fragment is present, a value which indicates a non-fragment, rather than a valid fragment identifier, is set. The fragment ID mask image 304 may be a single-channel 16-bit image, to support parameterisations with hundreds of fragments, which can result in a fragment identifier greater than the 8-bit limit of 255. The size of the fragment identifier mask image in pixels should be at least as large as the size of the texture image 203, and may be the same size. The fragment ID mask image 304 can be generated by initialising an empty texture image, iterating through each face 230 in the Faces array 202 of the mesh 200, and rasterising a triangle onto the texture image whose corners are the UV co-ordinates 234-239 of each vertex of the face 230, and whose channel value is the fragment identifier 340 of the face 230. The fragment identifier mask image 304 is stored in the augmented mesh 300. The augmentation method 500 ends at step 599 after execution of the step 550.

Figure 6:
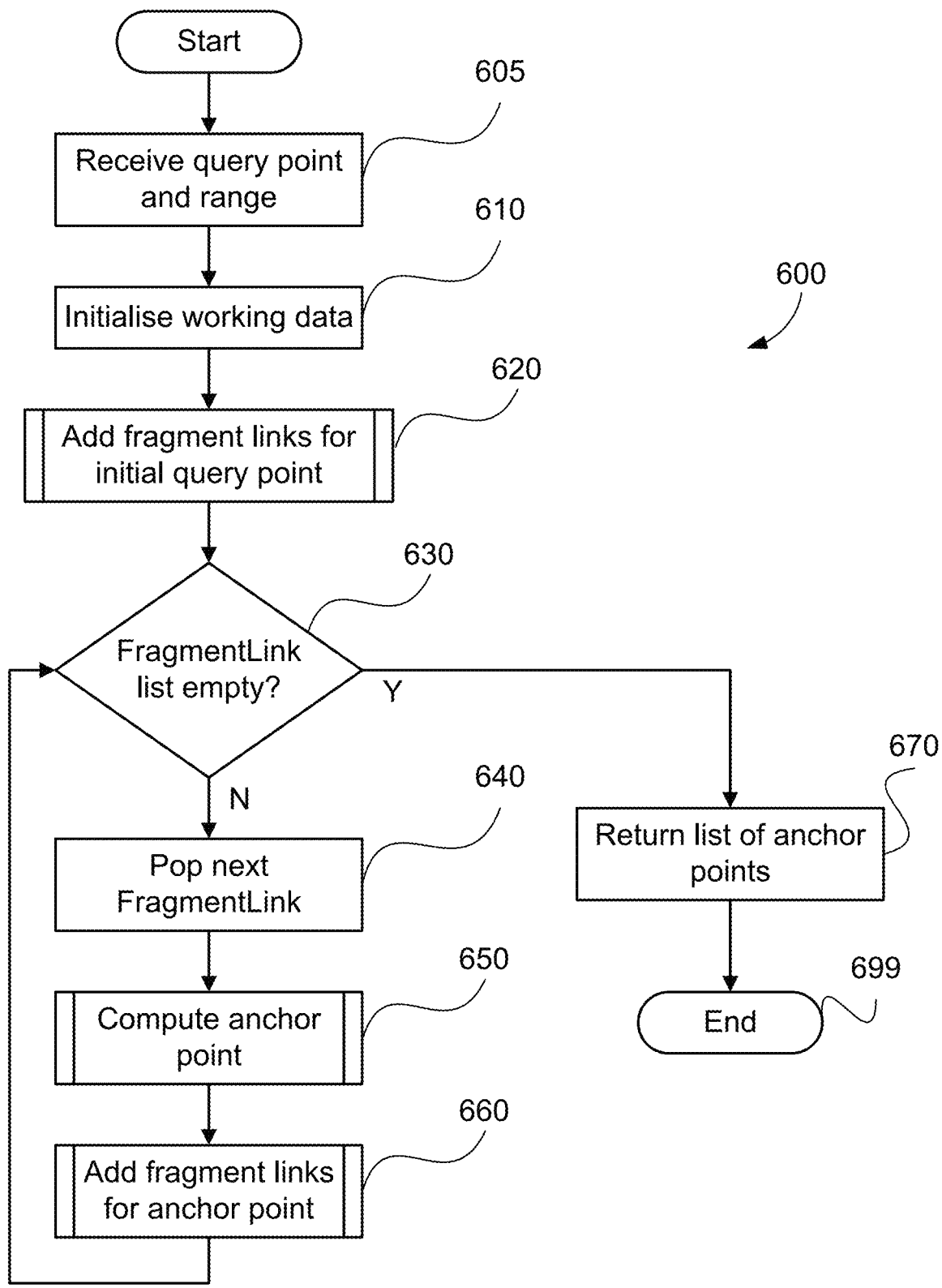
FIG. 6 shows a schematic flow diagram showing a neighbourhood query method.

Using the augmented mesh 300, the texture painting sub-module 121 or the texture sampling sub-module 122 performs neighbourhood queries robust to the presence of fragment seams via a neighbourhood query method 600 shown in FIG. 6. The method 600 may be implemented as one or more module of the application 1533, for example as the texture painting submodule 121 and the texture sampling submodule 122, stored in the memory 1506 and controlled under execution of the processor 1505.

The method 600 starts at a receiving step 605. In step 605, a query point and an associated query region or query range are received. The query point is positioned within a particular (reference) fragment of a texture image of the three-dimensional graphic object. The query point and region may be received as a user command for example by a user manipulating an input such as the mouse 1503 to interact with a graphical user interface associated with the main application 120. The interaction typically relates to applying a selected editing instrument such as a paintbrush cursor to a texture image of a three-dimensional graphic object represented by the augmented mesh 300. The position of the paintbrush cursor defines the query point (for example the centre-point of the paintbrush cursor in a fragment of the mesh 200) and the query region or mask (for example defined by the edges of the paintbrush cursor). The query point identifies a point of interest on the mesh surface, and may be represented with UV co-ordinates. The query range identifies a region of interest or mask around the query point on the mesh surface, and may be represented by a distance within which the query neighbourhood is to be processed (in both U and V). The augmented mesh 300 is represented by a number of fragments having UV coordinates.

Figure 4A:
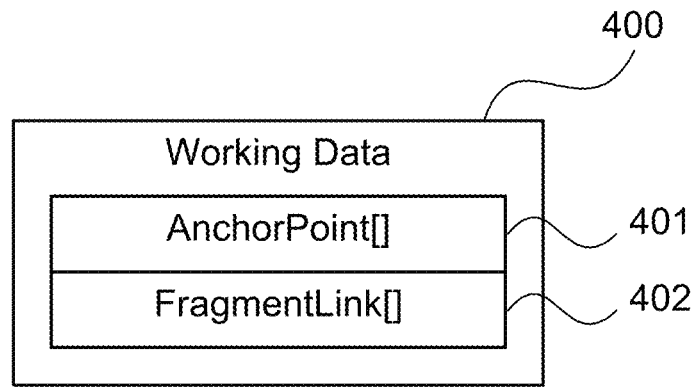
FIGS. 4A to 4C show a structure of working data associated with a 3D mesh.
Figure 4B:
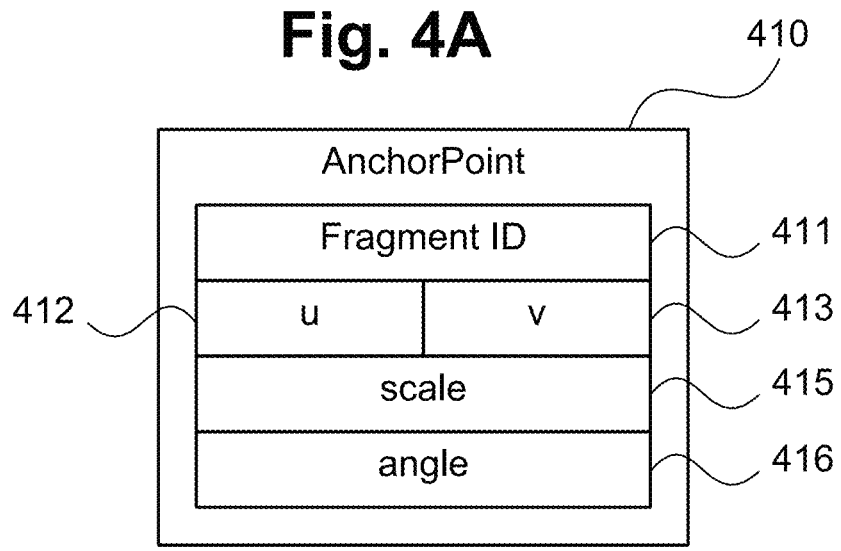
Figure 4C:
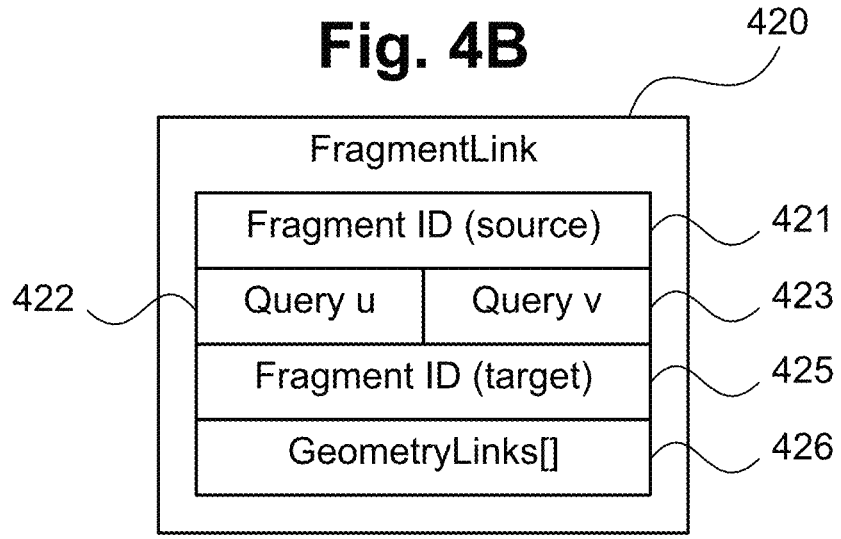

The method 600 progresses from step 605 to an initialising step 610. In step 610, working data 400 for the received query on the augmented mesh 300 is initialised. The working data 400 is shown in FIGS. 4A to 4C. The working data 400 consists of but is not limited to an AnchorPoint list 401 and a FragmentLink list 402, as shown in FIG. 4A. The AnchorPoint list 401 is a list of anchor points, an example AnchorPoint 410 being shown in FIG. 4B. Each Anchor-Point 410 has a Fragment identifier (ID) 411, UV co-ordinates 412-413 into the texture image 203, a scale value 415, and an angle value 416. The FragmentLink list 402 is a list of fragment links, an example FragmentLink 420 being shown in FIG. 4C. Each FragmentLink 420 relates a first fragment of the augmented mesh 300 to a neighbouring fragment via shared mesh geometry elements, and comprises a source fragment identifier 421, query UV co-ordinates 422-423, a target fragment identifier 425, and a GeometryLinks list 426 containing the shared or common mesh geometry elements.

Step 610 initialises the AnchorPoint list 401 with a single AnchorPoint, the anchor point 410, representing the received query point. The fragment identifier 411 of the reference fragment on which the query point is placed may be determined by looking up the fragment mask image 304 at the UV co-ordinates of the query point. The UV co-ordinates 412-413 of the anchor point 410 are set to the UV co-ordinates of the received query point. The scale 415 is set to 1.0, and the angle 416 is set to 0. The FragmentLink list 402 is initialised to an empty list.

The method 600 continues from step 610 to an adding step 620. In step 620, zero or more fragment links are populated for the initial query point, and added to the FragmentLink list 402. Step 620 invokes a fragment link creation method 700, described hereafter with reference to FIG. 7.

The method 600 continues from step 620 to a check step 630. Decision step 630 checks whether the FragmentLink list 402 is empty. If the FragmentLink list 402 is not empty ("N" at step 630), the method 500 continues to a removing step 640. At step 640, a FragmentLink is selected from the FragmentLink list 402. The FragmentLink 420 with the greatest number of GeometryLinks in the corresponding GeometryLinks array 426 may be selected to improve the accuracy of cross-fragment geometry calculations. A FragmentLink may alternatively be selected arbitrarily. The selected FragmentLink is removed ("popped") from the FragmentLink list 402 of the working data 400. If the AnchorPoint list 401 contains an anchor point 410 with a fragment ID 411 matching the target fragment ID 425 of the popped FragmentLink 420, then the popped FragmentLink 420 may be discarded, since an anchor point has already been found for the target fragment identifier 425. In this event, the FragmentLink list may be checked for more FragmentLinks again at step 630, and a different FragmentLink may be popped at step 640.

The method 600 continues from step 640 to a determining step 650. In step 650, the selected fragment link is used to determine a new anchor point with respect to a target fragment for which an anchor point has not yet been determined, and adds the anchor point to the AnchorPoint list 401. Step 650 invokes anchor point determination method 800, described below with reference to FIG. 8.

The query point and a pre-determined mask are passed to the anchor point determination method 800. The method 600 continues from step 650 to an adding step 660. At step 660, zero or more fragment links are populated for the newly determined anchor point, and added to the FragmentLink list 402. Step 660 again invokes the fragment link creation method 700.

In general, each anchor point determined in step 650 may result in further fragment links being created in step 660, and each fragment link determined at step 660 may be used at a subsequent iteration of step 650 to determine a new anchor point. Each subsequent anchor point may thus be determined based on common geometry data, for example a vertex and/or a point on an edge, associated with a first reference fragment and a target fragment, but also a second reference fragment (corresponding to the first target fragment) and second target fragment.

The neighbourhood query method 600 then returns to the decision step 630, and proceeds in a loop until FragmentLink list 402 is empty. If FragmentLink list 402 is empty ("Y" at step 630), the method 600 continues to a returning step 670, in which the AnchorPoint list 401 is returned, and the neighbourhood query method 600 terminates at step 699.

Steps 630 to 660 operate to determine an anchor point for each fragment of the three-dimensional graphic object associated with the query region corresponding to the query point. As each anchor point relates to a different fragment, each anchor point typically has a different location in the texture image.

Figure 7:
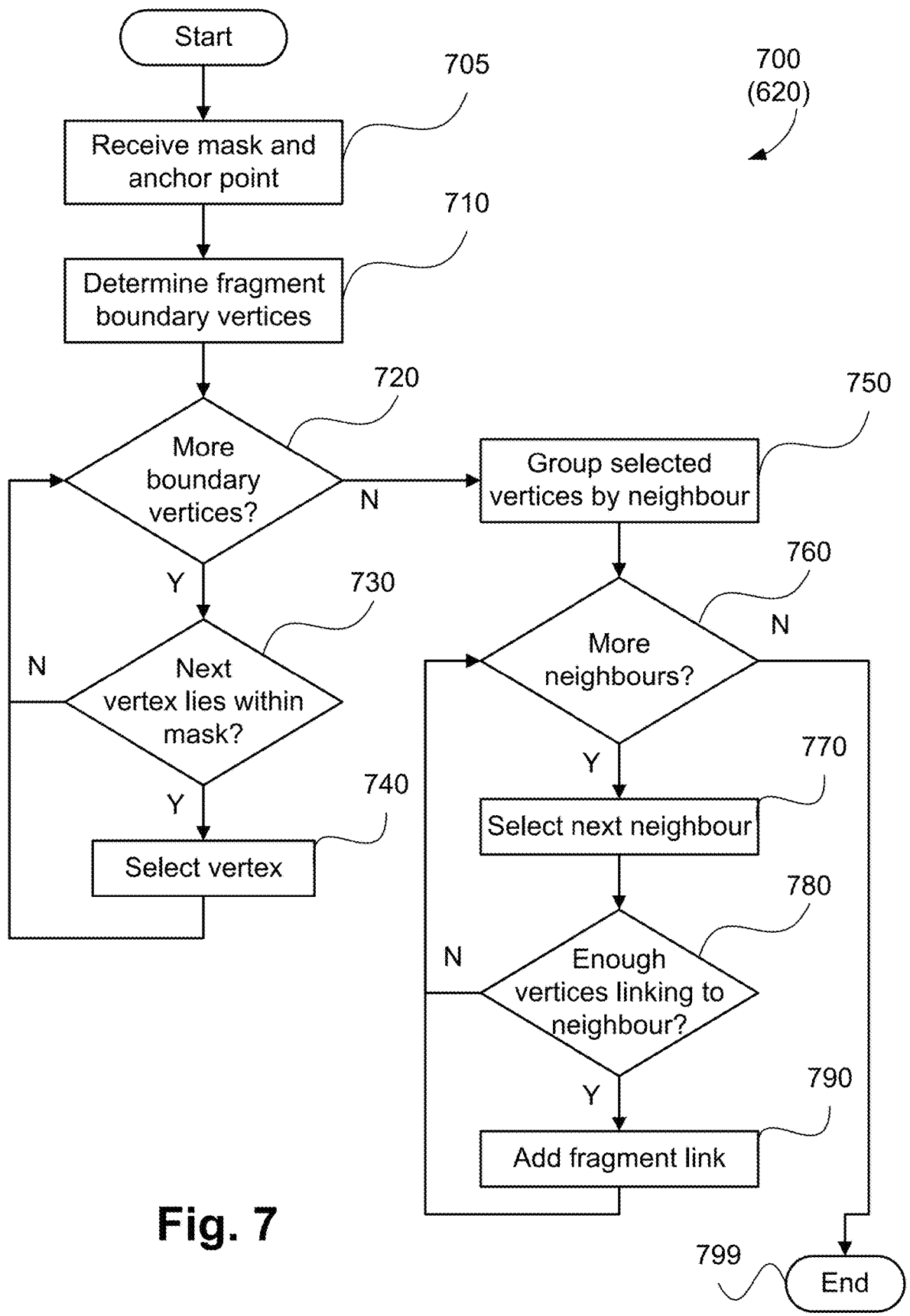
FIG. 7 shows a schematic flow diagram showing a method of adding fragment links, as used in the method of FIG. 6.

The fragment link creation method 700 of FIG. 7, as implemented at step 620, is now described. The method 700 finds neighbouring fragments within the query region and creates FragmentLink working data for each. The method 700 may be implemented as one or more modules of the application 1533, for example as the texture painting submodule 121 and the texture sampling submodule 122, stored in the memory 1506 and controlled under execution of the processor 1505.

The method 700 begins at a receiving step 705. In step 705 the mask (query region) and anchor point of the query on the augmented mesh 300 are received. The anchor point 410 has a fragment ID 411, a UV co-ordinate location 412-413 into the texture image 203, a scale 415, and an angle 416. The mask may be represented by a range value, denoting the number of pixels in each direction (up, down, left, or right) to which the mask extends. The representation may include a square mask, with a side length of twice the range value plus one. Other mask representations and mask shapes can be used.

The method 700 continues from step 705 to a determining step 710. In step 710, the fragment boundary vertices of the fragment associated with the anchor point 410 are determined. The vertices are the contents of the FragmentBoundaryVertex array 351 found by indexing the Fragment array 305 of the augmented mesh 300 by the ID of the current fragment, which is the fragment identifier 411 of the anchor point 410.

The method 700 continues to a check step 720. Steps 720-740 operate to search for vertices at the boundary of the current fragment which lie within the query mask. Step 720 checks whether further fragment boundary vertices remain to be considered. If so ("Y" at step 720), at the method 600 continues to a check step 730. At step 730, the next fragment boundary vertex 360 is selected, and is checked to see if the UV co-ordinates 362-363 of the selected boundary vertex lie within the query mask. For an anchor point 410 derived from the initial query point, the anchor point scale 415 is 1.0 and rotation 416 is 0, as set in step 610 of the method 600. Accordingly, the fragment boundary vertex 360 lies within the mask if the absolute difference of the U co-ordinate 362 of the vertex and the anchor point's U co-ordinate 412 are less than or equal to the query mask range value, and the absolute difference of the V co-ordinate 363 of the vertex and the anchor point's V co-ordinate 413 are also less than or equal to the query mask range value. In general, an anchor point may have a non-unity scale and a non-zero rotation. The boundary vertex UV co-ordinates 362-363 are transformed into the anchor point's frame of reference using standard trigonometry before testing if the boundary vertex lies within the bounds of the query mask. If step 730 determines that the boundary vertex 360 lies within the query mask ("Y" at step 730), the method 7000 continues to a selecting step 740. At step 740, the boundary vertex 360 is marked as selected. The method 700 then returns to step 720. The method 700 also returns to step 720 from step 730 if the boundary vertex was found to not lie within the query mask ("N" at step 730).

Steps 720-740 continue to execute until all boundary vertices in the FragmentBoundaryVertex array 351 of the current fragment have been searched (that is step 720 returns "N"). The steps 720-740 describe a brute search technique, but other search methods such as grid-based partitioning are possible. When step 720 finds that no more boundary vertices remain to be checked ("N" at step 720), the fragment link creation method 700 continues to a grouping step 750. In step 750 all fragment boundary vertices 360 marked as selected in step 740 are grouped according to their neighbouring fragment identifier 364. The grouping may be done by initialising an empty list, keyed by fragment identifier, and then iterating through each selected fragment boundary vertex 360, and inspecting the neighbouring fragment identifier 364, which was initialised at step 540 of mesh augmentation method 500. If a list entry exists for the neighbouring fragment identifier 364, then the fragment boundary vertex 360 is appended to the corresponding list entry. Otherwise, a new list entry is created for the fragment boundary vertex 360. The result of step 750 is a list of neighbouring fragments, each neighbouring fragment comprising a set of fragment boundary vertices 360.

The method 700 continues from step 750 to a check step 760. Steps 760-790 operate to create a fragment link for each neighbouring fragment of the current fragment which was found from the selected fragment boundary vertices within the query region. The fragment link is used in the anchor point determination method 800 (described in relation to FIG. 8) to position an anchor point with relation to a neighbouring fragment. The step 760 checks whether any further neighbouring fragments remain to be processed. If so ("Y" at step 760, the method 700 continues to a selecting step 770. At step 770, the next neighbouring fragment is selected. In this way, if a single boundary vertex has multiple neighbours, each neighbour is considered in turn. The method 700 continues from step 770 to a check step 780. The step 780 checks whether enough boundary vertices were found to form a fragment link with the neighbouring fragment. Two or more boundary vertices are required to form a fragment link. If there are not enough vertices ("N" at step 780), the fragment link creation method 700 returns to step 760.

If there are enough vertices ("Y" at step 780), the method 700 continues to a creating step 790. A fragment link is created in execution of step 790. The fragment link 420 is created comprising a source fragment identifier 421 of the current fragment identifier, as determined by the fragment identifier 411 of the anchor point 410; Query UV co-ordinates 422-423 equal to the UV co-ordinates 412-413 of the anchor point 410; a target fragment identifier 425 corresponding to the neighbouring fragment selected at step 770, and a GeometryLinks array 426 containing the set of fragment boundary vertices 360 in the neighbouring fragment. Each element of the GeometryLinks array 426 may be an integer index into the FragmentBoundaryVertex array 351 of the current fragment. The GeometryLinks array 426 provides a geometric relationship between points on one side of the shared fragment boundary and points on the other side of the boundary. During the anchor point determination method 800 (described in relation to FIG. 8), the geometric relationship of the GeometryLinks array 426 allows the anchor point to be positioned in the second fragment, given a known anchor point position in the first fragment.

If the target fragment identifier 425 of the created fragment link 420 matches the fragment identifier 411 of an anchor point 410 within the AnchorPoint list 401, then an anchor point for the target fragment has already been found, and the target link may be discarded. Otherwise, the created fragment link 420 is added to the FragmentLink list 402 of the working data 400. The fragment link creation method 700 returns from step 790 to the step 760.

At step 760, if there are no further neighbouring fragments to be selected, the method 700 terminates at step 799.

Figure 8:
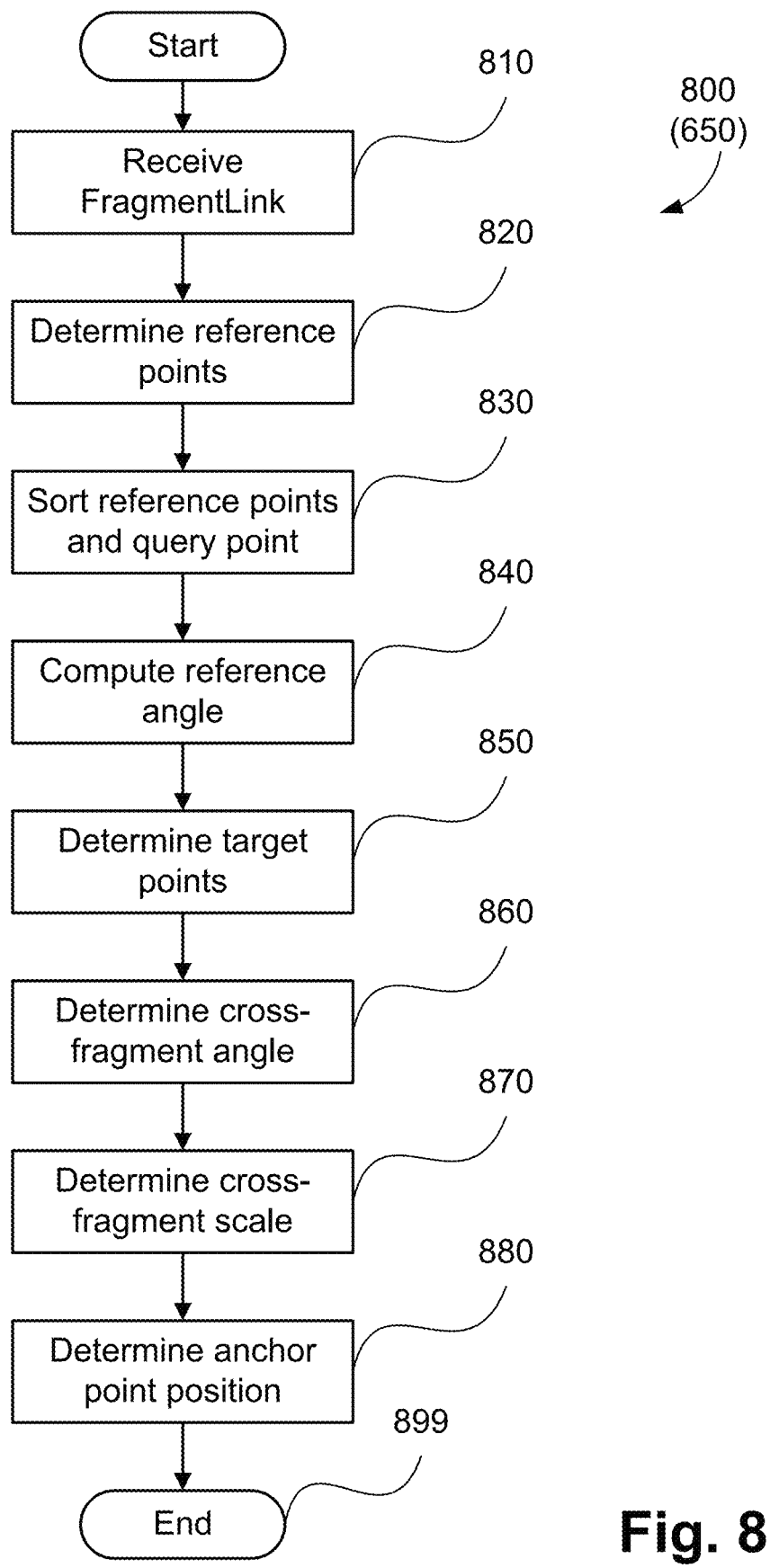
FIG. 8 shows a schematic flow diagram showing a method of determining an anchor point, as used in the method of FIG. 6.

The anchor point determination method 800, as implemented at step 650, is now described with reference to FIG. 8. The method 800 may be implemented as one or more modules of the application 1533, for example as the texture painting submodule 121 and the texture sampling submodule 122, stored in the memory 1506 and controlled under execution of the processor 1505.

The method 800 performs geometric computation on the FragmentLink 420 in order to determine the angle, scale, and position of a corresponding anchor point in a neighbouring fragment. The method 800 begins at a receiving step 810. At step 810 the FragmentLink 420 is received. The FragmentLink 420 comprises a source fragment identifier 421; a query UV location 422-423; a target fragment identifier 425, and a list of geometry links 426 at the fragment boundary between the source and target fragments within the query region.

The method 800 continues from step 810 to a determining step 820. Step 820 determines reference points on the boundary of the source fragment. The determined reference points correspond to mesh geometry elements at the fragment boundary, such as vertices. The reference points are found using the GeometryLinks array 426 of the received FragmentLink 420. The reference points are used to determine a relative geometry across the fragment boundary, so a wider baseline between the points is less susceptible to instability due to local distortion. Therefore the pair of vertices in the GeometryLinks array 426 which are the most distant from each other are selected as the reference points. The points of the array 426 are constrained to a boundary of the fragment relating to the query region as determined in step 710 for each fragment. Effectively, relevant points of the array 426 are constrained to a boundary of the fragment relating to a common boundary of an adjoining fragment in the query region.

The method 800 continues from step 820 to a sorting step 830. The co-ordinates of the two reference points and the query point 422-423 form a triangle. In step 830, the points of the triangle are sorted to form a consistent ordering. The ordering may be determined by first finding which side of the line from the first reference point to the second reference point the query point lies on. If the query point lies on one pre-determined side of the line (such as the left side), then the two reference points are swapped. If the query point does not lie on the predetermined side of the line for which a swap is required, then no change is made. In this way, after step 830, the query point always lies on a consistent side of the line (such as the right side), allowing subsequent angle calculations to disregard sign changes which might otherwise be required due to different orientations.

The method 800 continues from step 830 to a determining step 840. In step 840, a reference angle of the triangle is determined. The reference angle may be formed by taking the angle between the line from the first reference point to the second reference point, and the line from the first reference point to the query point.

The method 800 continues from step 840 to a determining step 850. Step 850 determines target points on the boundary of the target fragment, which correspond to the reference points on the boundary of the source fragment. Where the reference points lie on the source fragment identified by the source fragment identifier 421, the target points are corresponding points lying on the target fragment identified by the target fragment identifier 425. The vertex reference in the GeometryLinks array 426 corresponding to the first reference point is looked up in the FragmentBoundaryVertex array 360 member of the Fragment array 305 corresponding to the source fragment ID 421, to find the FragmentBoundaryVertex 360 corresponding to the first vertex reference. The vertex reference Vref 361 and UV co-ordinates 362-363 are found from the FragmentBoundaryVertex 360.

The first target point has the same vertex reference Vref 361, but different UV co-ordinates (the co-ordinates lie in the target fragment). The target point can be found by accessing the Vertex 210 with reference 361 and inspecting the faces adjacent to the vertex via the corresponding VFAdj array 317, until a neighbouring face is found whose fragment identifier 340 matches the target fragment identifier 425 of the FragmentLink 420. The first target point is then given the UV co-ordinates 234-239 corresponding to the vertex 210 of the first reference point within the found neighbouring face. The second target point is found in the same way, using the second reference point.

Steps 820 and 830 effectively operate to determine reference points on a boundary of the reference fragment (the fragment of the query point) using the query region. The reference points are associated with target points on a boundary of a target fragment of the texture image, as determined at step 850. The reference points and the query point form a reference angle, as described below with reference to step 860.

The method 800 continues from step 850 to a determining step 860. Steps 860-880, to be described, operate to determine a target angle, target scale, and anchor point position respectively, relating the query point from the source fragment to the target fragment.

In step 860, a relative local cross-fragment target angle is determined, representing the change in direction to the target fragment, relative to the initial fragment of the query. Because texture fragments may be packed into the texture image 203 at any orientation, any given reference direction in a first fragment (for example, pointing rightwards, in the direction of increasing X) may correspond to any different direction in a neighbouring fragment (for example, pointing diagonally down and left). Furthermore, such directions are not fixed for a whole fragment, but can vary according to the degree of distortion accepted in the parameterisation. Knowing the reference points and corresponding target points, a relative local direction in the neighbourhood of the query region may be determined. The angle between the line from the first reference point to the second reference point and the reference direction is subtracted from the angle between the line from the first target point to the second target point and the reference direction. The difference between the angles is used to determine the relative target angle 416 of the anchor point 410. The reference direction can be an arbitrary direction for a single overall view or presentation of the object represented by the mesh 200 in UV space.

The method 800 continues from step 860 to a determining step 870. In step 870, a relative local cross-fragment target scale is determined, representing the change in local scale in the target fragment, relative to the initial fragment of the query. The cross-fragment target scale represents a ratio of a distance between the reference points and a distance between the target points. Because texture fragments may be packed at different scales in the texture image 203, the local scale in UV space may vary across a fragment boundary, even if the scale on the surface of the mesh 200 remains constant. Like relative angle, the scale can vary over a fragment. The ratio of the distance between the reference points to the distance between the target points is an indicator of relative scale, and this ratio is set as the relative target scale 415 associated with the anchor point 410.

The method 800 continues from step 870 to a determining step 880. Finally, in step 880, the co-ordinates of the query point are determined with respect to the neighbouring fragment to be used as the anchor point's location. Conceptually, a reference triangle formed by the reference points and the query points 422-423 is a similar (same-angled) triangle to a target triangle formed by the target points and the anchor point. Given the query point, reference points, and target points, this allows the anchor point to be found. The anchor point is determined using the target points of step 850 and the reference angle such that angles between the anchor point and the target points of step 850 correspond to angles between the query point and the relevant reference points of step 830. The anchor point may be determined as a displacement from the first target point. The distance of the displacement is equal to the distance of the query point from the reference point is multiplied by the relative scale 415, and the direction of the displacement is the reference angle determined in step 840 plus the relative angle 416 of the anchor point. For a target fragment that does not contain the query point received at step 605 (effectively a target fragment) the anchor point is located outside the target fragment.

The determined anchor point 410 is added to the AnchorPoint list 401 of the working data 400 at step 880. Upon completion of step 880, the anchor point determination method 800 terminates at step 899.

Figure 9:
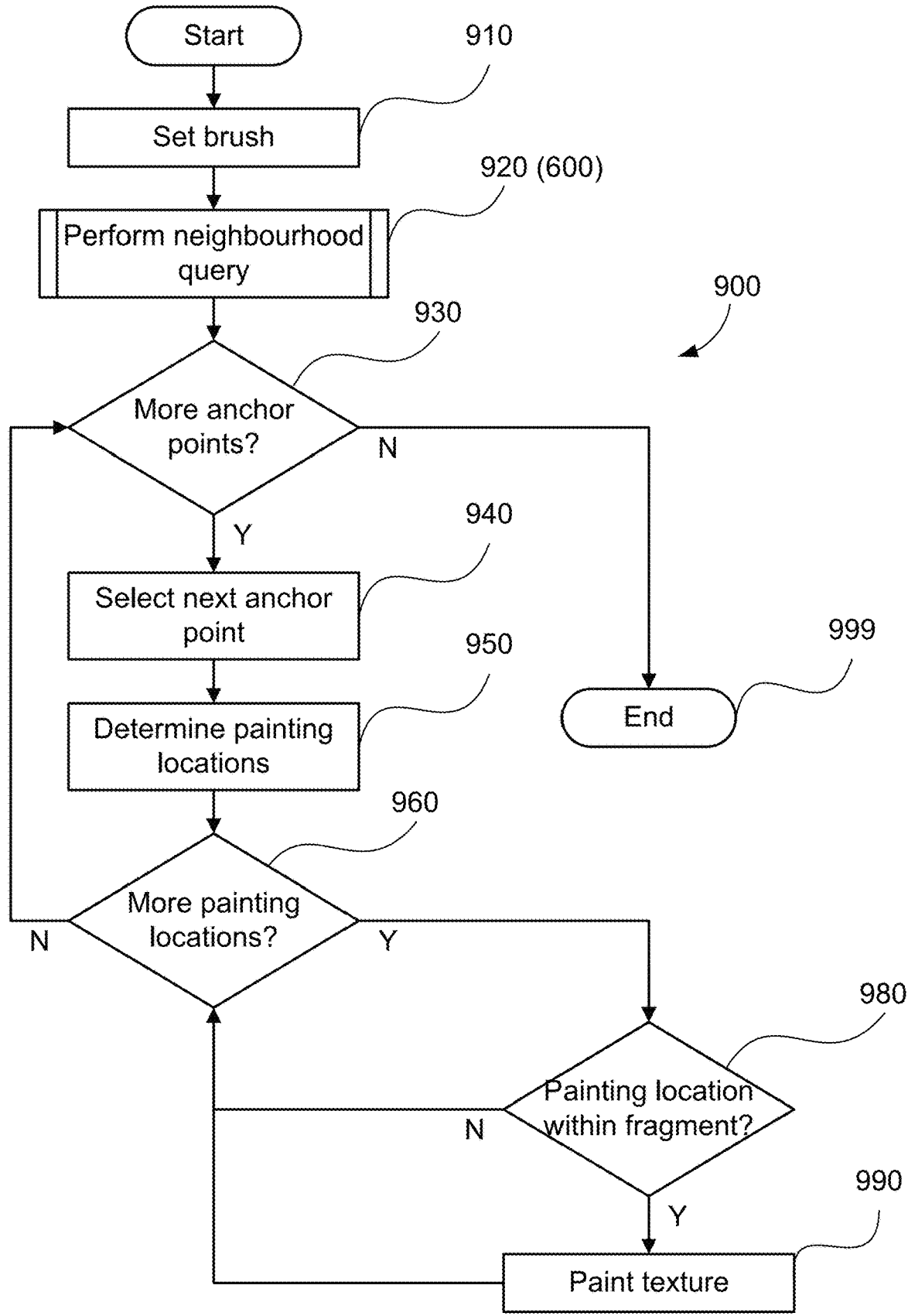
FIG. 9 shows a schematic flow diagram showing a method of editing a graphic object.

The texture painting sub-module 121 of the mesh processing module 120 uses the neighbourhood query method 600 to enable interactive editing (for example painting) of a mesh surface, regardless of the presence of fragment seams, according to a mesh painting method 900 shown in FIG. 9. The method 900 may be implemented as one or more modules of the application 1533, for example as the texture painting module 121, stored in the memory 1506 and controlled under execution of the processor 1505.

Editing a texture of a graphical object by mesh painting is not limited to painting colour or intensity values on a mesh surface, but can include painting of other surface characteristics including, but not limited to, material segmentation, opacity, roughness, anisotropy, or specularity.

The method 900 begins at a setting step 910. In step 910 a brush is set in the mesh editing application 120. The brush may be set according to a user selection from a set of available brush shapes (such as circles, squares, lines, or other shapes) and sizes. At step 910, a painting operation may also be selected, such as a colour to paint in, or a segmentation region to expand.

The method 900 continues from step 910 to a neighbourhood query step 920. Step 920 invokes the neighbourhood query method 600, providing an initial anchor point and range which are received by the neighbourhood query method 600 at step 605. The initial anchor point is set as a point in UV space at which the user has performed a painting operation on a graphical representation of a three-dimensional texture object. The texture object is represented by the augmented mesh 300. The range may be set as a square around the anchor point which bounds the selected brush shape and size in the graphical representation. The user may click on a point on the parameterised mesh surface in a 2D view such as the texture image 203, in which case the co-ordinates of the mouse cursor 1503 in the UV co-ordinate space form the anchor point. The user may instead click on a point on the mesh surface in a 3D view. If the user clicks on a point in a 3D view, the co-ordinates of the mouse cursor in screen space are projected onto the mesh surface to find a face such as face 230a of the mesh 300 and a location within the face. The location is transformed to UV co-ordinates by interpolating within the UV co-ordinates 234-239 of the face. As described above, the neighbourhood query method 600 returns a list of anchor points comprising positions, angles, scales, and fragment identifiers which relate the query point to other fragments within the neighbourhood of the query.

The method 900 continues from step 920 to a check step 930. Anchor point check step 930 checks whether there are more anchor points 410 returned from the neighbourhood query method 600 invoked by step 920 which have not yet been processed. If there are more anchor points to process ("Y" at step 930), the method 900 continues to a selecting step 940. At step 940, the next anchor point 410 is selected. The method 900 continues from step 940 to a determining step 950. At step 950, a set of painting locations is determined. The painting locations are pixels in UV space which may be painted by the painting operation if they are within the fragment associated with the selected anchor point. The painting locations may be determined by selecting each pixel location that falls within the brush when the brush outline is scaled according to the scale 415, rotated according to the angle 416, and positioned according to the UV co-ordinates 412-413 of the selected anchor point 410. Step 950 operates to determine the portion of each fragment covered by the query region. For a fragment that did not contain the query point received at step 605 (effectively a target fragment) the corresponding anchor point and the reference angle determined at step 805 are used to determine the relevant portion of the target fragment covered by the query region. The query region (mask) is positioned according to the anchor point. The positioning comprises transforming the query region by rotating the query region according to the target angle of step 860, and scaling the query region according to the target scale of step 870. The query region is effectively translated in the texture image 203 based on the anchor point and the geometric relationship with the previous anchor or query point. Each of the target angle, the anchor point and the scale represent geometry data (or a geometric relationship) by which the query region may be translated for a given fragment. Where multiple fragments are covered by a query region, the step 950 is transformed based on geometry data associated with the reference fragment, and any subsequently processed target regions. Step 950 relates to transforming the region to determine a corresponding portion of the fragment to be edited. The transformation is based on the anchor point and relative placement in the texture image of a fragment and a corresponding reference fragment. The relative placement relates to the query region, scale, angle and the like between the fragments.

The method 900 continues from step 950 to a check step 960. Painting steps 960-990, to be described, operate to paint the painting locations which lie within the fragment associated with the selected anchor point. Painting check step 960 checks whether there are more UV-space painting locations which have not yet been processed for the current anchor point. If so ("Y" at step 960), the method 900 continues to a check step 980. Step 980 checks whether the next painting location lies within the current fragment, which is determined using the fragment identifier 411 of the selected anchor point 410. The next painting location may be determined by inspecting the value of the pixel of the fragment mask image 304 at the painting location. If the value is equal to the fragment identifier 411 then the painting location is within the fragment. If the next painting location is in the current fragment ("Y" at step 980), the method 900 continues to a painting step 990. In step 990, the texture is painted at the painting location according to the painting operation that was selected in step 910. Step 990 effectively processes the three-dimensional graphic object represented by the mesh 200 using the determined portion(s) of the each fragment to edit the associated portions of the object. The processing operates to edit texture of the associated portions of the fragments, for example by applying a paint operation for a visual property of the graphic object. The resultant edited graphic object can be rendered by the rendering module 130 and displayed on the display 1517.

After the texture is painted at the painting location at step 990, or if in step 980 the painting location is not within the fragment ("N" at step 980), the painting method 900 returns to painting check step 960, which repeats for each painting location. When step 960 identifies no unprocessed painting locations ("N" at step 960), the method 900 returns to the anchor point check step 930, which repeats until no more anchor points remain in the list of anchor points 410 returned from the neighbourhood query method 600. When no more anchor points remain to be processed ("N" at step 930), the method 900 terminates at step 999.

Figure 10:
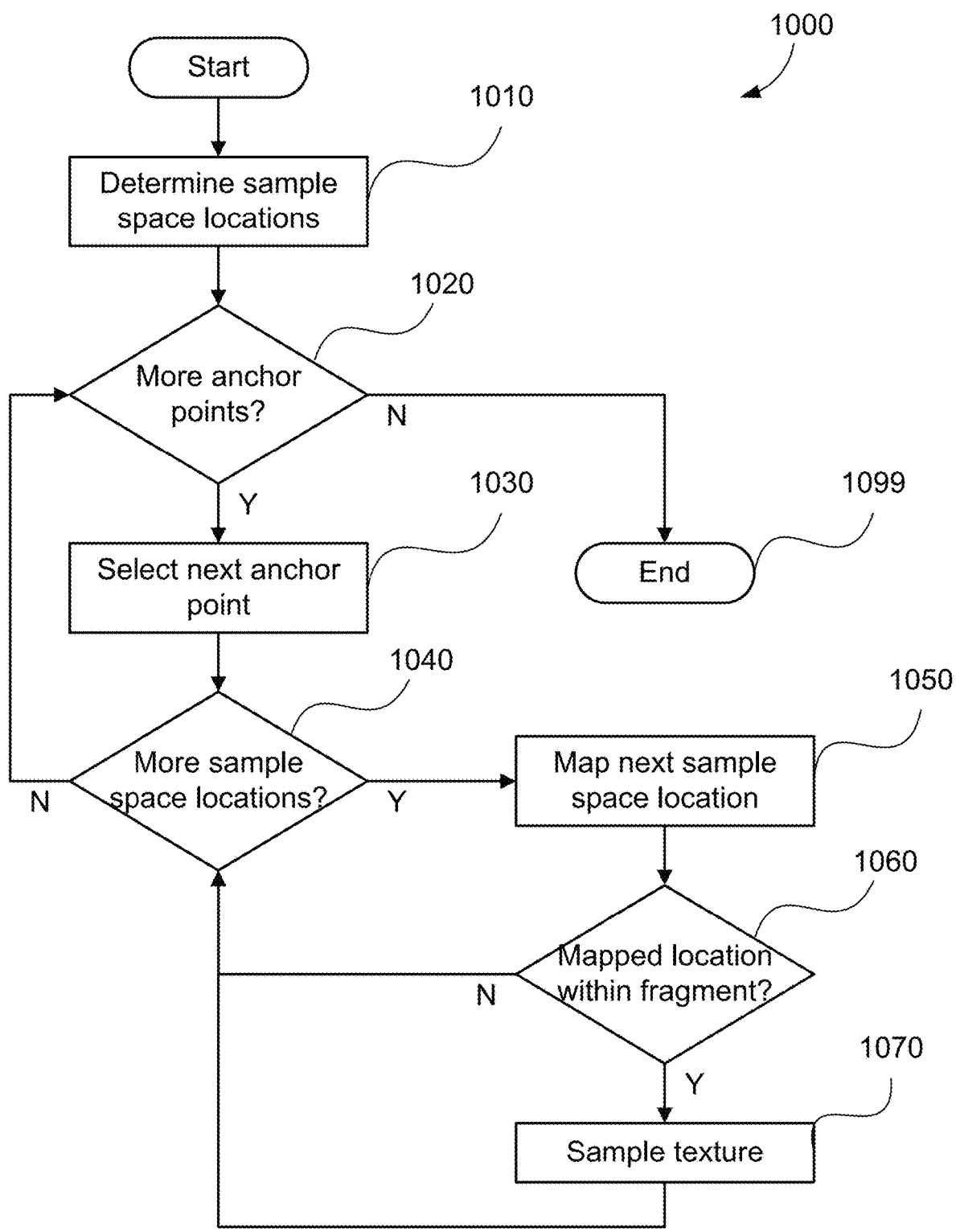
FIG. 10 shows a schematic flow diagram showing a method of sampling from a neighbourhood query region.

The texture sampling sub-module 122 of the mesh processing module 120 uses the neighbourhood query method 600 to enable sampling a UV-mapped mesh surface, regardless of the presence of fragment seams, according to a texture sampling method 1000 shown in FIG. 10. The method 1000 may be implemented as one or more modules of the application 1533, for example the texture sampling submodule 122, stored in the memory 1506 and controlled under execution of the processor 1505. Texture sampling generates a contiguous patch of pixels corresponding to a local portion of the surface of the mesh as defined by a texture image 203, and may be formed from discontiguous pixels at any location of the texture image 203, depending on the mesh parameterisation.

The texture sampling method 1000 operates on a list of anchor points, such as the anchor point produced by neighbourhood query method 600, as previously described. The method 1000 begins at a determining step 1010. In step 1010 a set of sample space locations are determined. The sample space may for example be a square pixel grid, whose size depends on the purpose of the sampling operation. For example, for a purpose such as analysing scattering effects in the scale of a few pixels, a sample space of a few pixels may suffice.

The method 1000 continues from step 1010 to an anchor point check step 1020. Step 1020 checks whether there are more anchor points 410 which have not yet been processed. If there are more anchor points to process ("Y" at step 1020), the method 1000 continues to step 1030. At step 1030, the next anchor point 410 is selected.

The method 1000 continues from step 1030 to a sampling check step 1040. Step 1040 checks whether there are more sample space locations which have not yet been processed for the current anchor point. If so ("Y" at step 1040), the method 1000 continues to a mapping step 1050. Step 1050 maps the next sample space location to UV space (that is, to the co-ordinate system of texture image 203). The mapping is performed by transforming the sample space location around the centre of the sample space according to the inverse of the scale 415 and angle 416 of the selected anchor point 410, and translating the rotated and scaled sample space location so as to position the centre of the sample space at the UV co-ordinates 412-413 of the selected anchor point 410.

The method 1000 continues from step 1050 to a mapping check step 1060. Step 1060 checks whether the next mapped sample space location lies within the current fragment. Whether the next mapped sample space location lies within the current fragment is determined using the fragment ID 411 of the selected anchor point 410. Whether the next mapped sample space location lies within the current fragment may be determined by inspecting the value of the pixel of the fragment mask image 304 at the mapped sample space location. If the value is equal to the fragment ID 411 then the mapped sample space location is within the fragment and step 1060 returns "Y". In this case, the method 1000 continues from step 1060 to a sampling step 1070. At step 1070, the texture is sampled at the mapped sampling location. A variety of sampling methods can be used. Nearest neighbour sampling may be used for example, in which the nearest pixel value of the texture image 203 is retrieved and written to the (unmapped) sample space location. Other sampling techniques such as bilinear sampling, bi-cubic sampling, or sinc sampling may also be applied, taking pixel values from each contributing fragment as necessary to form a single sample space value.

After the location has been sampled in step 1070, or if in step 1060 the mapped sample space location is not within the fragment ("N" at step 1060), the sampling method 1000 returns to the sampling check step 1040. The loop from step 1040 to step 1070, repeats for each sample space location. When step 1040 identifies no unprocessed sample space locations ("N) at step 1040, the method 1000 returns to the anchor point check step 1020. The step 1020 repeats until no more anchor points remain in the list of anchor points 410. When no more anchor points remain to be processed, the method 1000 terminates at step 1099.

Neighbourhood query sampling operations may be combined around the boundary of a fragment to form a fragment margin image. A fragment margin image is a UV space image containing pixels of the texture image 203 corresponding to a single central fragment, as well as pixels of the texture image 203 corresponding to the boundary portions of one or more neighbouring fragments, positioned adjacent to the central fragment in the UV space image in effectively the same way as the neighbouring fragments are adjacent to the central fragment on a rendered 3D model of the mesh 200. An advantage of a margin image is that its adjacency information is captured in a single 2D image, rather than via the data structure of the 3D mesh 200, and is thus amenable to standard 2D image processing techniques, such as image alignment, stitching, or filtering.

Figure 11:
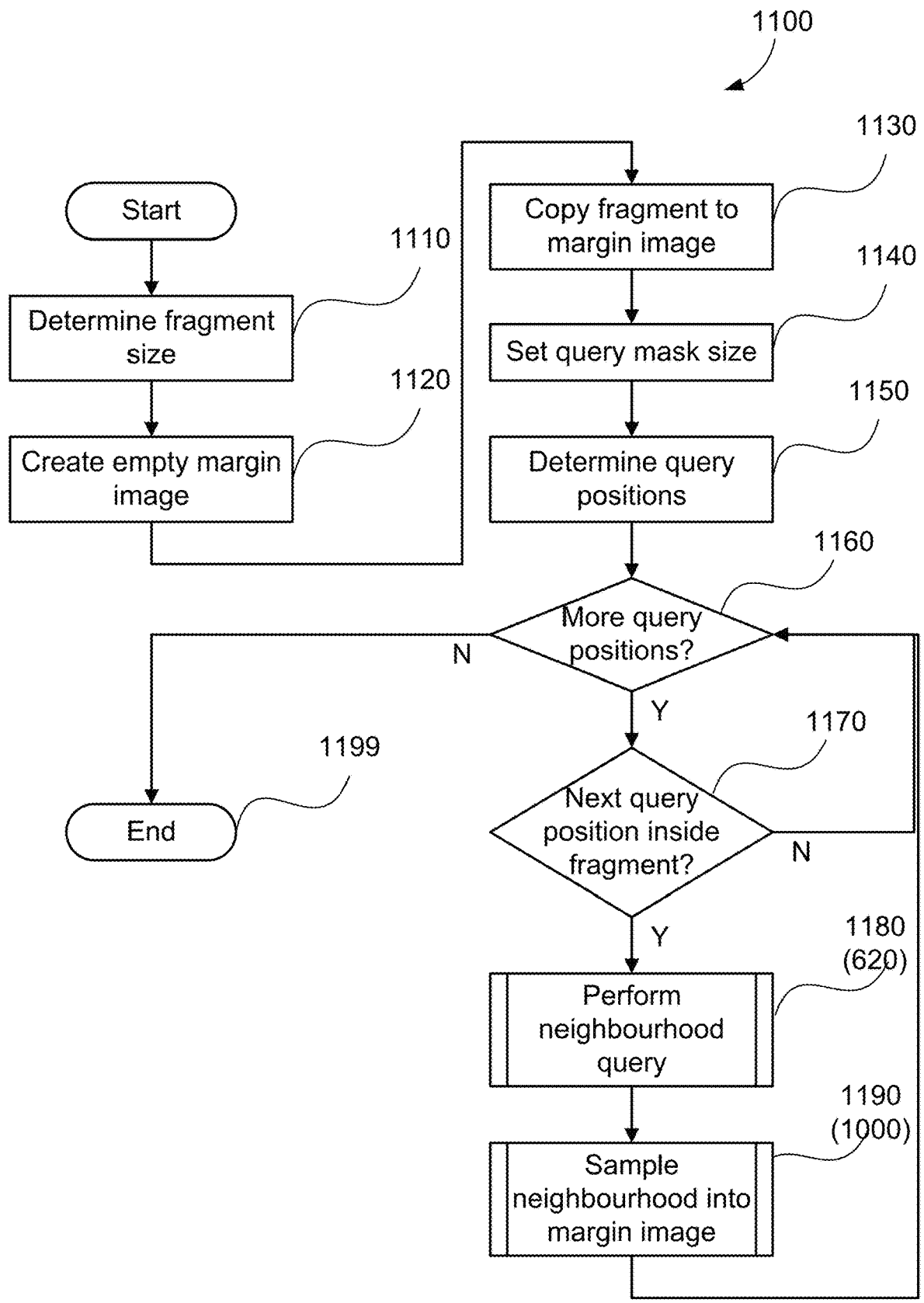
FIG. 11 shows a schematic flow diagram showing a method of generating a margin image.

A margin image with a pre-determined minimum boundary extent may be generated for a selected texture fragment according to a margin image generation method 1100 of FIG. 11. The method 1100 may be implemented as one or more modules of the application 1533, for example as the texture painting submodule 121 and the texture sampling submodule 122, stored in the memory 1506 and controlled under execution of the processor 1505.

The method 1100 begins at a determining step 1110. At step 1110 the size of the selected fragment in UV space is determined. The fragment size may be found by expanding an empty bounding box to encompass all UV co-ordinates 362-363 of fragment boundary vertices 360 of the fragment boundary vertex list 351 corresponding to the current fragment 350. In the case that the mesh 200 is not a closed mesh, the fragment may contain vertices at a mesh boundary. In this case, as well as expanding the bounding box to encompass all fragment boundary vertices (between multiple fragments), the bounding box is also expanded to encompass all mesh boundary vertices (vertices at a fragment boundary but not adjacent to another fragment). Mesh boundary vertices may be found according to known techniques, such as building a list of all edges, identifying edges adjacent to only a single face, and taking vertices of those edges as mesh boundary vertices. A technique for finding mesh boundary vertices may be performed during execution of the mesh augmentation method 500 to avoid expensive computation at query time.

The method 1100 continues from step 1110 to a creating step 1120. In step 1120, an empty margin image is created. The empty margin image is sized to hold not only the fragment but a margin around the fragment whose pixel values will be determined from the neighbouring fragments on the mesh 200. The size of the empty margin image is accordingly set to the fragment size, plus a value for both the U size and V size which is double the minimum boundary extent.

The method 1100 continues from step 1120 to a copying step 1130. In step 1130, the selected fragment is copied into the empty margin image. Pixels are conditionally copied from a rectangular region of the texture image 203 corresponding to the bounding box of the fragment. The pixels are copied conditionally because a fragment's bounding box may contain other fragments. The pixels are copied only if the corresponding pixel value of the fragment mask image 304 is the fragment identifier of the selected fragment. The pixels are copied into the margin image such that the top-left pixel of the fragment in the texture image 203 is conditionally copied to an offset into the margin image equal to the minimum boundary extent. By creating the margin image and copying the fragment in this way, an empty margin equal to the minimum boundary extent exists on all sides of the fragment.

The method 1100 continues from step 1130 to a setting step 1140. In step 1140, a query mask size is set. To ensure that the combined neighbourhood queries will surround the fragment on all sides by at least the minimum boundary extent, the query mask is set to double the minimum boundary extent. The method 1100 continues from step 1140 to a determining step 1150. In step 1150, a set of query positions is determined. The set of query positions may correspond to a sampling grid covering the margin image. To ensure that the combined neighbourhood queries will surround the fragment on all sides by at least the minimum boundary extent, the grid spacing is set to the minimum boundary extent. In the case that the fragment shape contains protrusions whose size is less than the sampling grid size, there may exist portions of the fragment at which the width of the corresponding generated margin is less than the minimum boundary extent. This may be addressed by various methods, such as increasing the sampling grid resolution, adding additional samples where such a protrusion is detected, and/or moving sample points which do not lie on the fragment to a nearby location which does lie on the fragment.

The method 1100 continues from step 1150 to a check step 1160. At step 1160, the margin image generation method 1100 checks whether there are any query positions which have not yet been processed. If so ("Y" at step 1160), the method 1100 continues to a check step 1170. At 1170, the query position is checked to see if the query position lies inside the selected fragment. The check may be performed by inspecting the pixel of the fragment mask image 304 at the query position, and comparing that value to the fragment ID of the selected fragment. If the values don't match ("N" at step 1170), then the query position does not lie inside the selected fragment. In this case, the query position may be skipped, and the method 1100 returns to check step 1160. If, at step 1170, the query position is found to lie inside the selected fragment, the method 1100 continues to step 1180. Step 1180 performs a neighbourhood query, invoking the neighbourhood query method 600. Step 1180 passes a query point and region, received at step 605 of neighbourhood query method 600. The query position is passed as the query point, and the query mask size that was set in step 1140 is passed as the query region. The neighbourhood query performed at step 1180 returns the fragment neighbourhood around the query point as a list of anchor points.

The method 1100 continues from step 1180 to a sampling step 1190. At step 1190, the neighbourhood is sampled into the margin image. The step 1190 invokes texture sampling method 1000, providing the list of anchor points as an input, and providing a location in the margin image centred at the query position as the sample space to receive texture samples. In the arrangements described, the method 1000 may be performed in a no-overwrite mode. In a no-overwrite mode, before writing any texture pixel into the sample space, the existing sample space pixel value is checked. If a value has already been written into the sample space pixel, then instead of overwriting it, the sampling operation is skipped. Additionally, step 1190 may be skipped in the case that the list of anchor points contains only a single anchor point. This case occurs when the query region lies completely inside the selected fragments, and does not overlap any fragment boundaries. In no-overwrite mode, no additional sampled pixels would be added to the margin image in such a case. Accordingly, the margin image is generated by combining texture of the fragment and texture of the portions of the relevant bounding (target) fragment for the query point or position.

After the texture has been sampled over the neighbourhood of the current query position in step 1190, the margin image creation method 1100 returns to check step 1160, which checks again whether there are any further query positions remaining to be processed. The method 1100 continues to perform neighbourhood queries and sampling the texture at the corresponding anchor points as long as there are any. Accordingly, the margin image is generated at step 1190 using the determined portion of each query points or positions. If no further query positions remain to be processed in step 1160 ("N" at step 1160), then the margin image is complete, and the method 1100 terminates at step 1199.

Figure 12A:
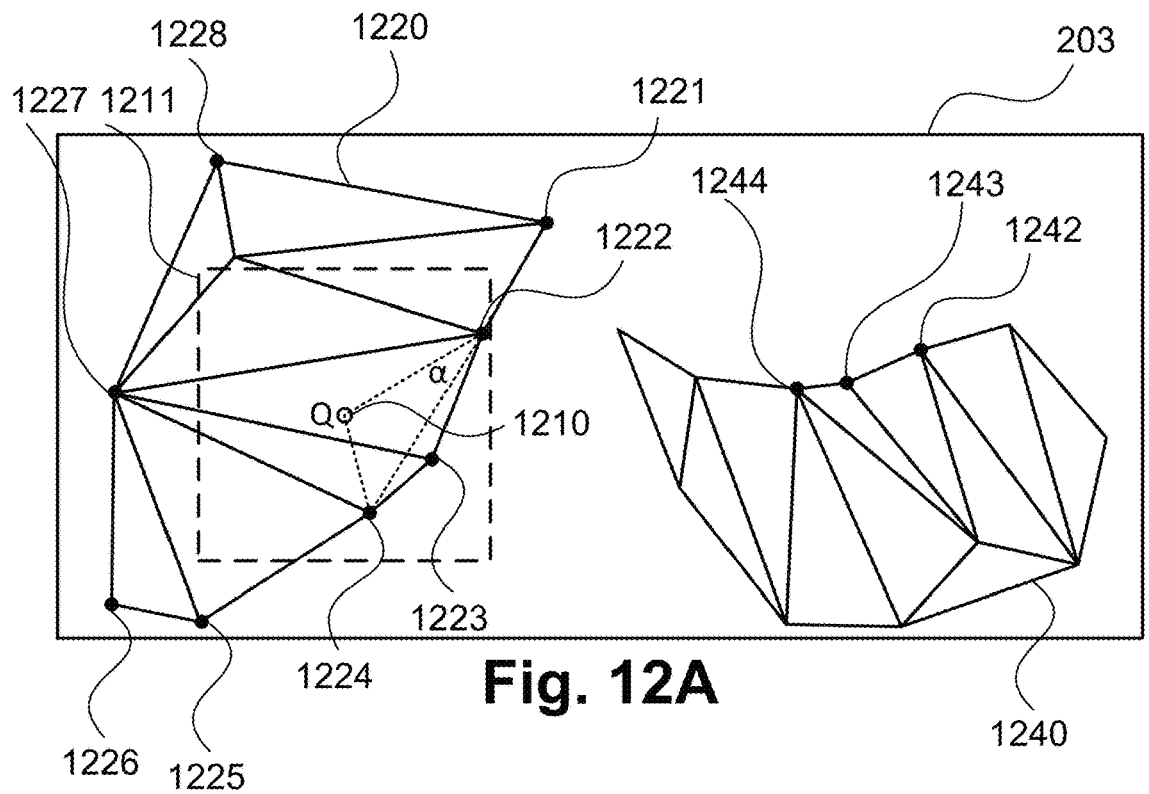
FIGS. 12A and 12B show an example of editing a graphic object.
Figure 12B:
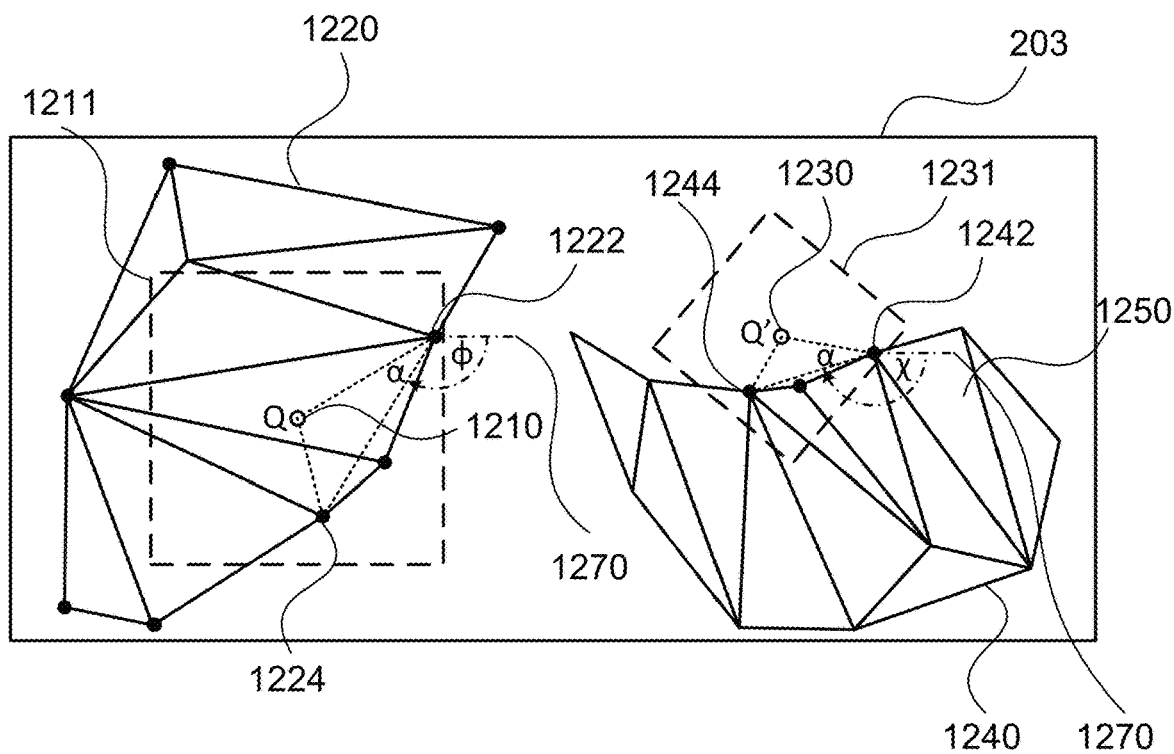

FIGS. 12A and 12B collectively show an example of executing the neighbourhood query method 600, performed using a texture map 1203 comprising a reference fragment 1220 and a target fragment 1240 of the mesh 300. Referring to FIG. 12A, at step 605, a query point Q 1210 on the reference fragment 1220 and a range defining the query region 1211 are received. The range may be the horizontal or vertical distance from query point Q 1210 to an edge of the query mask 1211. At step 610, working data is initialised. The AnchorPoint list 401 is initialised with a single anchor point 410 corresponding to query point 1210. The FragmentLink list 402 is initialised to an empty list.

In step 620, the fragment link creation method 700 is invoked to create fragment links for the initial query point 1210. Step 705 receives the mask (query region) 1211 and anchor point 1210. Step 710 identifies the fragment boundary vertices of the reference fragment 1220. The identifier of reference fragment 1220 is indexed into the fragment array 305 of the mesh 300, and the FragmentBoundaryVertex list 351 of the corresponding fragment contains a fragment boundary vertex entry 360 for each boundary vertex 1221-1228 of the reference fragment 1220, specifying the vertex identifier 361, UV co-ordinates 362-363, and a neighbouring fragment identifier 364 for each boundary vertex.

Steps 720-740 iterate through each of the boundary vertices 1221-1228, identifying the vertices which lie within the query mask 1211. Step 730 identifies boundary vertices 1222, 1223, and 1224 as lying within the query mask 1211. Step 740 selects the three boundary vertices 1222-1224. The boundary vertices 1221, 1225, 1226, 1227, and 1228 are identified as not lying within the query mask 1211.

Step 750 groups the selected boundary vertices 1222-1224 by fragment neighbour. In the case of the texture map 203 of FIG. 12A, the neighbour of all three selected boundary vertices 1222-1224 is the target fragment 1240, and so a single group of three vertices is formed. Step 760 identifies the single neighbour to be processed, selected in step 770. Step 780 finds three linking vertices, which is enough to link to a neighbour, and so step 790 adds a fragment link 420 to FragmentLink list 402 consisting of source fragment ID of reference fragment 1220, query UV co-ordinates of query point 1210, target fragment ID of target fragment 1240, and a GeometryLinks list referencing boundary vertices 1222-1224. The method 700 returns to step 760, at which no further neighbouring fragments are found, and so the method 700 terminates at step 799, returning to step 620 of the parent method 600.

At step 630, the FragmentLink list 402 is not empty, having a single entry just added by the method 700. Accordingly, at step 640, the FragmentLink 420 is popped from FragmentLink list 402. The FragmentLink 420 has a target fragment ID 425 not matching any anchor point 410 in the AnchorPoint list 401, since the AnchorPoint list 401 is empty.

Referring to FIG. 12B, step 650 of the neighbourhood query method 600 invokes the anchor point determination method 800, providing the popped FragmentLink 420, received by anchor point determination method 800 at step 810. In the reference point determination step 820, reference points 1222 and 1224 are determined, being the most distant GeometryLinks 426 of the FragmentLink 420. In step 830, the reference points and query points are sorted to form a consistent ordering. Because the query point lies on the right hand side of a line travelling from first reference point 1222 to second reference point 1224, the ordering is already consistent and no swapping is required.

Step 840 determines a reference angle α, formed as the angle between a line joining the first reference point 1222 and second reference point 1224, and a line joining the first reference point 1222 and query point 1210. Step 850 then determines target points of target fragment 1240 corresponding to the reference points 1222 and 1224 on reference fragment 1220. For reference point 1222, the mesh faces surrounding the reference are found in the vertex-face adjacency element (VFAdj) 317 of the vertex 210a of the reference point 1222. The fragment ID 340 of each such face 230 is inspected to find a face 230a having fragment ID 340 matching the target fragment 1240. For example, face 1250 has fragment ID 340 matching the target fragment 1240. In the face 1250, in the example of FIG. 12B, vertex 0 231 corresponds to the reference point 1222, and so UV co-ordinates u0 234 and v0 235 are retrieved. These are the co-ordinates of the target point 1242 corresponding to the reference point 1222 for target fragment 1240. Similar steps are performed to identify target point 1244 corresponding to reference point 1224.

In step 860, a cross-fragment target angle is determined. The cross-fragment angle is determined by determining an angle φ formed between the line joining the reference points 1222 and 1224 with respect to a reference direction 1270. Further, an angle x formed between the line joining corresponding target points 1242 and 1244 with respect to the reference direction 1270 is determined. The cross-target fragment angle is determined by subtracting the angle φ of the line between the reference points 1222 and 1224 from the angle x of the line between corresponding target points 1242 and 1244, giving a resulting target angle in the example of FIG. 12B of about 45°. In step 870, a cross-fragment target scale is determined by dividing the length of the line segment between the target points 1242 and 1244 by the length of the line segment between corresponding reference points 1222 and 1224, giving a resulting scale in this example of about 0.7.

In step 880, the anchor point's UV co-ordinates with respect to the target fragment 1240 are determined. The anchor point's position relative to the target fragment 1240 corresponds to the position of the query point 1224 relative to the reference fragment 1220. Conceptually, a triangle formed by query point 1210 and reference points 1222 and 1224 should be "similar" (same-angled) to a triangle formed by the (unknown) anchor point and the (known) target points 1242 and 1244. An anchor point Q' 1230 may thus be found by a displacement from the first target point 1242 where the angle of the displacement is equal to the reference angle α plus the absolute angle in UV space formed by the line from first target point 1242 to second target point 1244, and the distance of the displacement is equal to the distance from the query point 1210 to the first reference point 1222 multiplied by the cross-fragment-scale determined in step 870. The anchor point determination method 800 then terminates at step 899, returning to step 650 of the neighbourhood query method 600. The method 800 is repeated for each relevant fragment. Accordingly, each anchor point can be used as a query point for a further target fragment covered by the query region.

At step 660, the method 700 is invoked again to add fragment links for the newly positioned anchor point 1230, with respect to target fragment 1240. Steps 705-750 identify boundary vertices 1242, 1243, and 1244 within the scaled and rotated query mask 1231. However, because all of these vertices neighbour reference fragment 1220, and an anchor point 410 exists in the AnchorPoint list 401 having the fragment ID of fragment 1220, a fragment link for the already-positioned fragment 1220 is not added to the list 402 in step 790. Step 630 of neighbourhood query process 600 then finds an empty FragmentLink list 402, and so in step 670, the list of two anchor points (original query point 1210 and anchor point 1230), and the corresponding fragment ID, scale, and angle for each, are returned.

The portion of the reference fragment 1210 covered by the query mask 1211 at query point 1210, plus the portion of the target fragment 1240 covered by the rotated and scaled mask 1231 at anchor point 1430, may be used to perform image processing on the texture image 203 of the mesh 300 according to any standard 2D image processing technique, the techniques described herein overcoming the difficulties presented by the boundary between the fragments 1420 and 1440.

Figure 13A:
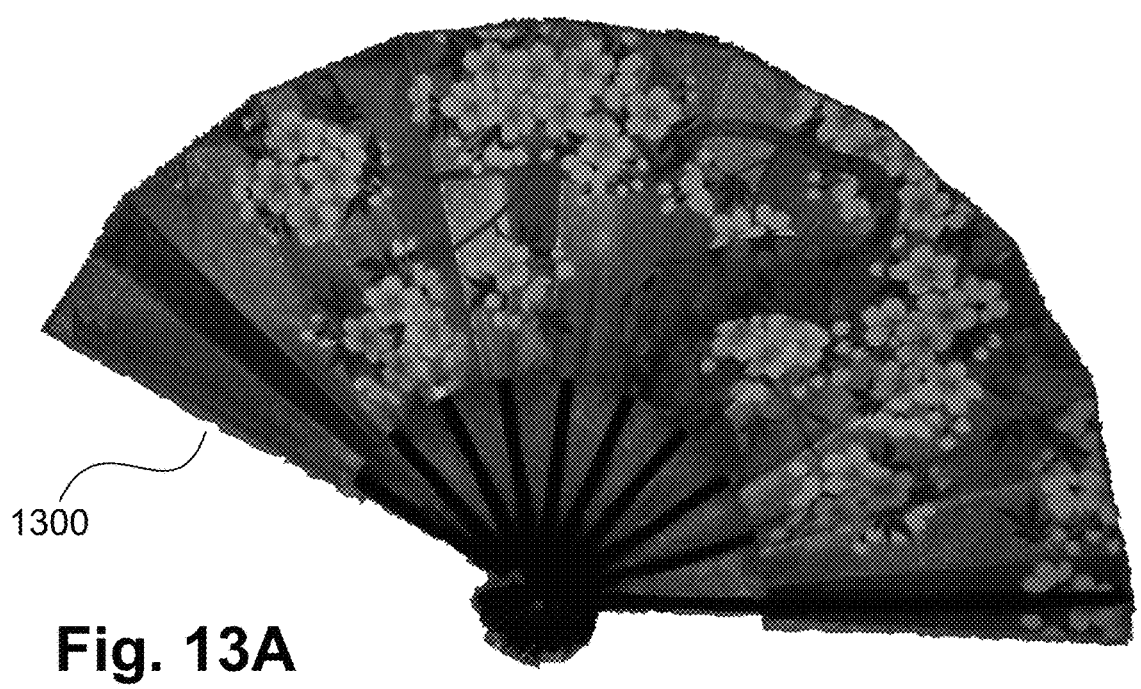
FIGS. 13A to 13C show an example rendered mesh and neighbourhood query margin image.

FIG. 13A shows a texture image 1303 of a fan object 1300. The fan object is represented by augmented mesh 300.

Figure 13B:
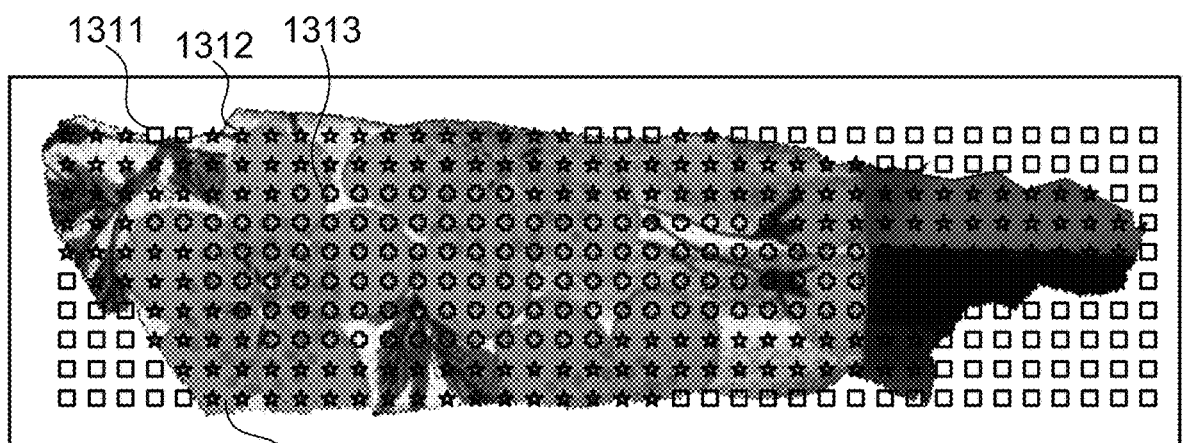

The texture image corresponds to the image 203. The texture image 203 contains all surface details of the fan, split into multiple fragments. FIG. 13B depicts one example fragment 1310, overlaid with query point indicators, as an example of margin image generation method 1100. The query point indicators are discussed in further detail below. Steps 1110 and 1120 determine a fragment size and create an empty margin image whose size corresponds to a margin image 1350. The margin image 1350 is sized sufficiently to contain the fragment 1310 with a minimum margin on each side equal to the boundary extent.

Step 1130 copies the fragment 1310 into the centre of the margin image 1350, and step 1140 determines the query mask size, equal to double the boundary extent. Step 1150 determines a set of query positions, each query position marked as a square such as 1311, a star such as 1]12, or a cross such as 1313 on fragment image 1350 for visualisation. Check step 1160 iterates over all determined query positions.

Step 1170 checks if the current query position is inside the fragment. Query positions in margin image 1350 marked as a square such as 1311 are all examples of query positions which are outside (not inside) the fragment 1350. For such query positions, step 1170 returns to check step 1160. Step 1180 invokes method 600 to perform a neighbourhood query operation on each remaining query position, including those marked as a star such as 1312, or cross such as 1313. Step 1190 samples the texture image 203 around each anchor point, writing pixel values into the margin image 1350. In the case that the resulting anchor point list 401 returned by the neighbourhood query method 600 contains only a single anchor point 410, step 1190 may be skipped. The query positions in the margin image 1350 marked by a plus shape, such as 1313 are all examples of query positions which return a single anchor point, for a query range equal to double the boundary extent. The remaining query positions in margin image 1350 are marked by a star shape such as 1312. The remaining query positions marked by a star shape are all examples of query positions which return one or more anchor points, for which step 1190 is performed to sample neighbouring fragments.

Figure 13C:
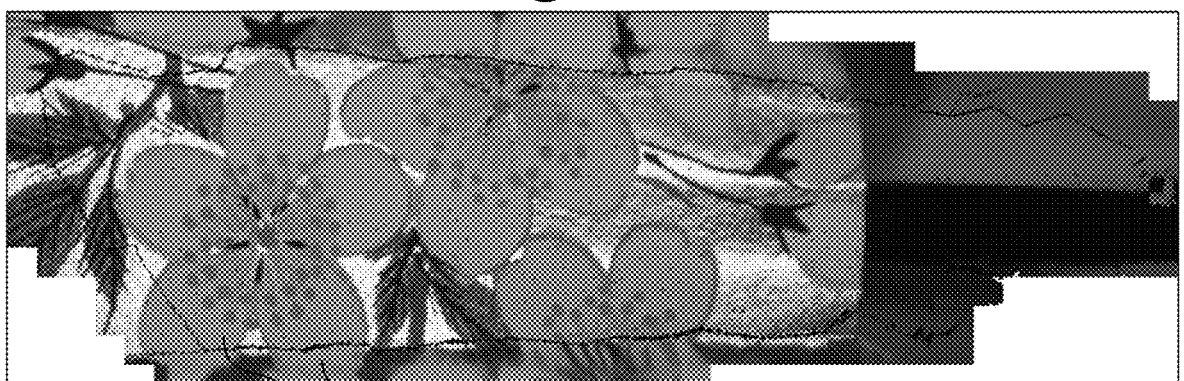

Steps 1160-1190 are performed for each query position, until all query positions have been processed, and the process 1100 terminates at step 1199. FIG. 11C shows the final margin image 1350 produced in the example of FIG. 13, containing the original fragment 1310, as well as portions of one or neighbouring fragments 1320, rendered in place within the margin image 1350, whose adjacency relative to the original fragment 1310 matches their adjacency on the surface of the mesh 200, as can be seen on the rendered mesh object 1300 of FIG. 13A. The example margin image 1350 is generated using low quality sampling and without special treatment of the texture pixels at the fragment boundary, allowing the original boundary of fragment 1310 to be seen as a rough outline. High quality sampling methods, as previously described, or infill techniques extending neighbouring pixels, may be used to avoid such visible outlines, if required.

The foregoing methods perform complete texture-based queries even in the vicinity of fragment boundaries, using fragment boundary vertices to relate a fragment to a neighbour. The described methods work successfully in the case that the mesh vertices are densely sampled with respect to the size of a typical query mask. In the case that mesh vertices appear sparsely over the mesh with respect to the size of a typical query mask, step 780 of the fragment link creation method 700 finds fewer than two vertices linking a fragment with its neighbour within a query mask. In such a case, the fragment link will not be created, and the resulting neighbourhood query may be incomplete. An alternative arrangement using mesh edges rather than vertices ("edge-based neighbourhood query") as the linking elements between fragments is robust to the case of sparse vertices.

In edge-based neighbourhood query, a fragment 350 in the Fragment list 305 of the mesh 300 contains not only a FragmentBoundaryVertex list 351, but a FragmentBoundaryEdge list (not shown). Each element of the FragmentBoundaryEdge list is a pair of FragmentBoundaryVertex 360 elements, which are connected by a mesh edge falling on the fragment boundary.

In edge-based neighbourhood query, step 540 of the mesh augmentation method 500 is expanded to build the FragmentBoundaryEdge list as well as the FragmentBoundaryVertex list 351. The remainder of mesh augmentation method 500 is unchanged.

In edge-based neighbourhood query, the fragment link creation method 700 performs effectively the same operations, with some modifications. Step 710 determines fragment boundary edges rather than vertices, using the FragmentBoundaryEdge list created by mesh augmentation method 500. Step 720 checks for more boundary edges, rather than more boundary vertices. Step 730 determines whether the next edge lies within the mask. The rectangular query mask may be rotated and scaled a single time according to the mask and anchor point received in step 705, and used repeatedly for testing for intersection with the line segment of each boundary edge. Intersection may be determined by standard techniques, such as checking if either endpoint lies within the rectangle of the query mask, or if any edge of the rectangle intersects the boundary edge. If the edge lies partially or wholly within the query mask, then the edge is selected in step 740. Step 750 groups the selected edges according to the neighbouring fragment of each edge. Step 760 iterates through each neighbour, and step 770 selects the next neighbour, as previously described. Step 780 may be skipped for edge-based neighbourhood query, since a single edge is enough to form a fragment link. Step 790 forms the fragment link as previously described, except that the GeometryLinks list 426 contains references to boundary edges within the FragmentBoundaryEdge list of the fragment 350, rather than references to boundary vertices within the FragmentBoundaryVertex list 351 of the fragment 350.

Figure 14A:
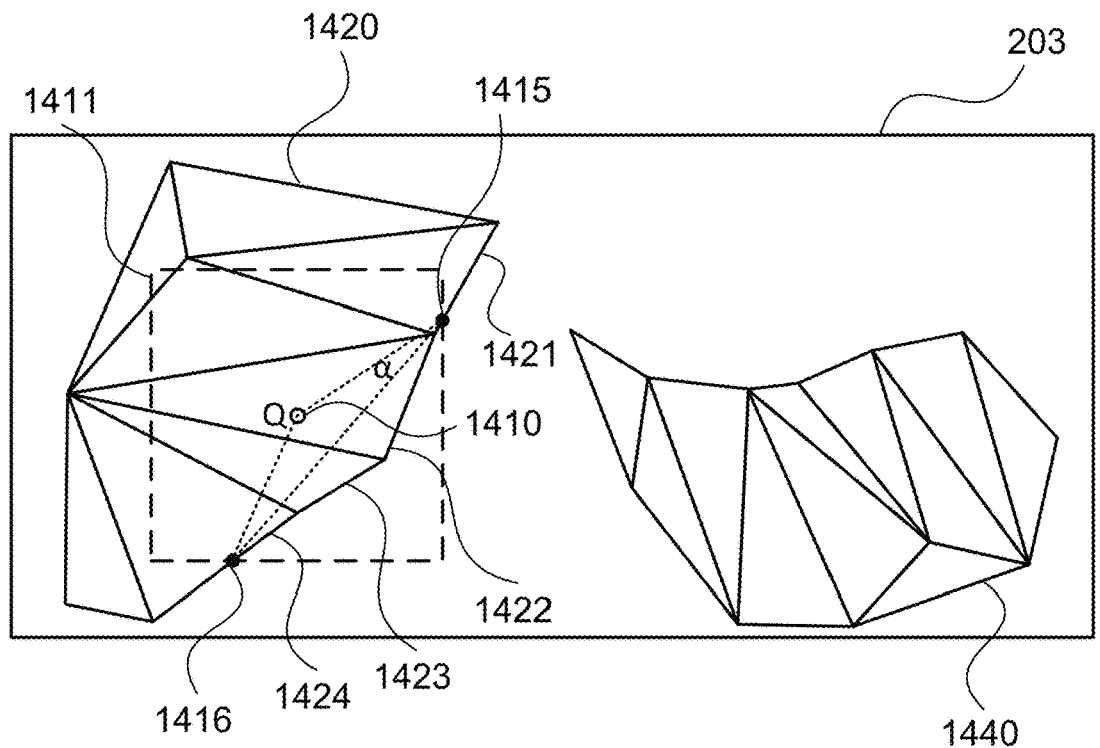
FIGS. 14A and 14B show a further example of editing a graphic object.

An example of edge-based neighbourhood query is illustrated in FIG. 14A, showing a texture image 1403 containing a reference fragment 1420 and a target fragment 1440. Boundary edges 1421, 1422, 1423, and 1424 of the reference fragment 1420 are found to lie partially or wholly within the mask 1411 associated with a query point 1410.

Figure 14B:
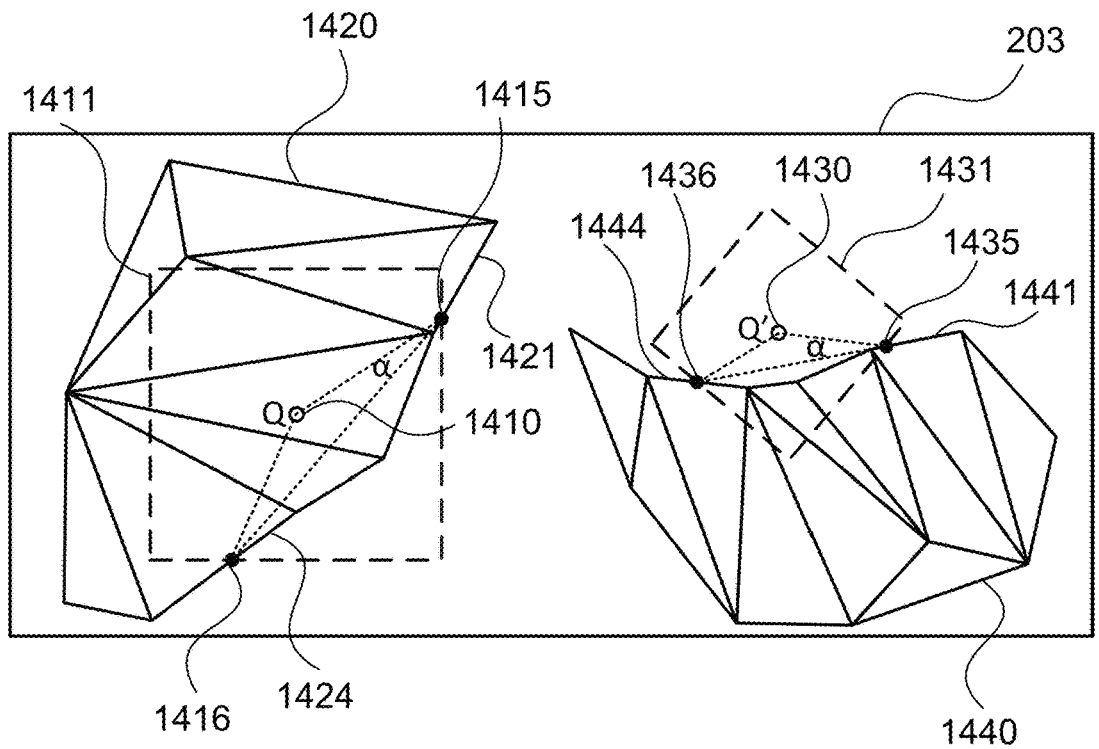

Further modifications necessary to perform edge-based neighbourhood query are in the anchor point determination method 800. In the reference point determination step 820, the most distant endpoints of edges referenced by the GeometryLinks array 426 may be selected as the reference points. Alternatively, the two most distant intersection points of the edges referenced by the GeometryLinks array 426 with the fragment mask may be found, and used as reference points. This is shown in FIG. 14B, in which mesh edges 1421 and 1124 intersect the mask 1411 associated with query point 1410 on reference fragment 1420, and the intersection points 1415 and 1416 corresponding to the edges 1421 and 1424 are selected as the reference points.

Target point determination step 850 is similarly modified. The most distant endpoints of edges of the neighbouring target fragment 1440 corresponding to the edges referenced by the GeometryLinks array 426 may be selected as the target points. Alternatively, as shown in FIG. 14B, target points 1435 and 1436 on edges 1441 and 1444 of target fragment 1440 corresponding to the most distant edges 1421 and 1424 referenced by the GeometryLinks array 426 may be determined. The distances of the target points 1435 and 1436 along each respective edge 1441 and 1444 correspond to the distances of the reference points 1415 and 1416 along their respective edges 1421 and 1424.

Cross-fragment target angle calculation step 860, cross-fragment target scale calculation step 870, and anchor point determine step 880 operate as described to identify anchor point Q' 1430 with respect to the target fragment 1440, using the edge-based reference points and corresponding target points.

The mesh 200 may have multiple texture images 203 based on the same UV parameterisation. An example of a mesh with multiple texture images is a model of a physical object which has been photographed from multiple viewpoints. Each photograph may be processed to form a texture image 203 corresponding to a viewpoint of the camera. In this example, if a region of the mesh surface needs to be processed over all viewpoints, a single neighbourhood query operation may be performed due to the neighbourhood query methods described herein being independent of texture map content. The resulting set anchor points may be used without modification for painting, sampling, or other image processing on every texture image 203 of the mesh 200.

The arrangements described are applicable to the computer and data processing industries and particularly for the three dimensional image processing industries. In determining corresponding reference points in a number of fragments, the arrangements described allow corresponding fragments to be determined quickly and without excessive computational congestion. In determining anchor points using reference and target points as designed, and determining the corresponding portion of target fragments using the geometric methods described, resultant texture editing across fragments is improved. Gaps and crack or a "jump" in painting are avoided. The arrangements described use the fragments described in the UV space in a manner to allow correspondence between a point on the mesh and the graphical texture image. Further, the arrangements described allow large queries across multiple fragments to be implemented interactively.

The foregoing describes only some embodiments of the present invention, and modifications and/or changes can be made thereto without departing from the scope and spirit of the invention, the embodiments being illustrative and not restrictive.

The invention claimed is:

1. A method for processing a three-dimensional graphic object, the method comprising:
   receiving a query point and a query region associated with the query point, the query point being positioned within a reference fragment of a texture image of the three-dimensional graphic object;
   determining reference points on a boundary of the reference fragment using the query region, the reference points being associated with target points on a boundary of a target fragment of the texture image, wherein the reference points and the query point form a reference angle;
   determining a portion of the target fragment covered by the query region using an anchor point located outside the target fragment, the anchor point being determined using the target points and the reference angle such that angles between the anchor point and the target points correspond to angles between the query point and the reference points; and
   processing the three-dimensional graphic object using the determined portion of the target fragment.

2. The method according to claim 1, wherein processing the graphic object comprises editing a texture of the graphic object.

3. The method according to claim 1, wherein the portion of the target fragment covered by the query region is determined by positioning the query region according to the anchor point.

4. The method according to claim 1, wherein the portion of the target fragment covered by the query region is determined by positioning the query region according to the anchor point, and the positioning comprises rotating the query region according to a target angle, scaling the query region according to a target scale, and translating the query region to the anchor point.

5. The method according to claim 1, wherein the portion of the target fragment covered by the query region is determined by positioning the query region according to the anchor point, the positioning comprises rotating the query region according to a target angle, scaling the query region according to a target scale, and translating the query region to the anchor point, and the target angle is a difference of a first angle and a second angle, the first angle being formed using the reference points and the second angle being formed using target points associated with the reference points.

6. The method according to claim 1, wherein the portion of the target fragment covered by the query region is determined by positioning the query region according to the anchor point, the positioning comprises rotating the query region according to a target angle, scaling the query region according to a target scale, and translating the query region to the anchor point, and the target scale is a ratio of a distance between the reference points and a distance between the target points.

7. The method according to claim 1, wherein the anchor point is determined such that a target triangle formed by the anchor point and target points is similar to a reference triangle formed by the query point and the reference points.

8. The method according to claim 1, wherein the reference points comprise a most distant pair of an array of points associated with the query region, the array of points being constrained to a boundary of the reference fragment relating to the query region.

9. The method according to claim 1, wherein each of the target points is associated with one of the reference points by means of a common geometry feature of the three-dimensional graphic object corresponding to both the target point and the reference point.

10. The method according to claim 1, wherein each of the target points is associated with one of the reference points by means of a common geometry feature of the three-dimensional graphic object corresponding to both the target point and the reference point, and the common geometry feature is at least one of a vertex and a point on an edge.

11. The method according to claim 1, wherein the portion of the target fragment covered by the query region is determined by positioning the query region according to the anchor point, the anchor point is used as a query point for a further target fragment, and the received query region is transformed based on geometry data associated with the reference fragment, the target fragment, and the further target fragment.

12. The method according to claim 1, wherein processing the graphic object comprises generating a margin image for the reference fragment using a plurality of query points, the margin image being generated by combining texture of the reference fragment and texture of the determined portion of the target fragment for each of the query points.

13. The method according to claim 1, wherein the three-dimensional graphic object is a polygonal mesh having a mapping between co-ordinates of the mesh and co-ordinates of the texture image.

14. A method of interactively editing a texture image of a three-dimensional mesh, the method comprising:
- receiving a user command to edit the texture image on the three-dimensional mesh, the user command defining a query point in a reference fragment and a region associated with the query point based on a selected editing instrument;
- for a fragment of a plurality of fragments of the texture image associated with the region, determining an anchor point corresponding to a location of the query point with respect to the fragment based on the three-dimensional mesh, the determined anchor point and the query point having different locations in the texture image;
- transforming the region to determine a corresponding portion of the fragment to be edited, the transformation being based on the anchor point and relative placement in the texture image of the fragment and the reference fragment; and
- interactively editing the texture image by applying the user command to the determined portion of the fragment.

15. The method according to claim 14, wherein the anchor point for each fragment is determined based upon common geometry features of the plurality of fragments.

16. The method according to claim 14, wherein the anchor point for each fragment is determined based upon pairs of most distant vertices of common edges of the plurality of fragments.

17. The method according to claim 14, wherein the relative placement in the texture image of the fragment and the reference fragment of the anchor points relates to a scale and an angle reflecting vertices on a common boundary of the adjoining ones of the plurality of fragments.

18. Apparatus, comprising:
- a processor; and
- a memory device storing a software program for directing the processor to perform a method for processing a three-dimensional graphic object, the method comprising the steps of:
- receiving a query point and a query region associated with the query point, the query point being positioned within a reference fragment of a texture image of the three-dimensional graphic object;
- determining reference points on a boundary of the reference fragment using the query region, the reference points being associated with target points on a boundary of a target fragment of the texture image, wherein the reference points and the query point form a reference angle;
- determining a portion of the target fragment covered by the query region using an anchor point located outside the target fragment, the anchor point being determined using the target points and the reference angle such that angles between the anchor point and the target points correspond to angles between the query point and the reference points; and
- processing the three-dimensional graphic object using the determined portion of the target fragment.

19. A system comprising:
- a processor; and
- a memory device storing a software program for directing the processor to perform a method comprising the steps of:
- receiving a query point and a query region associated with the query point, the query point being positioned within a reference fragment of a texture image of the three-dimensional graphic object;
- determining reference points on a boundary of the reference fragment using the query region, the reference points being associated with target points on a boundary of a target fragment of the texture image, wherein the reference points and the query point form a reference angle;
- determining a portion of the target fragment covered by the query region using an anchor point located outside the target fragment, the anchor point being determined using the target points and the reference angle such that angles between the anchor point and the target points correspond to angles between the query point and the reference points; and
- processing the three-dimensional graphic object using the determined portion of the target fragment.

20. A non-transitory computer readable storage medium storing program instructions for processing a three-dimensional graphic object, the program comprising:
- code for receiving a query point and a query region associated with the query point, the query point being positioned within a reference fragment of a texture image of the three-dimensional graphic object;
- code for determining reference points on a boundary of the reference fragment using the query region, the reference points being associated with target points on a boundary of a target fragment of the texture image, wherein the reference points and the query point form a reference angle;
- code for determining a portion of the target fragment covered by the query region using an anchor point located outside the target fragment, the anchor point being determined using the target points and the reference angle such that angles between the anchor point and the target points correspond to angles between the query point and the reference points; and
- code for processing the three-dimensional graphic object using the determined portion of the target fragment.

* * * * *